(12) United States Patent
Han et al.

(10) Patent No.: US 11,456,847 B2
(45) Date of Patent: Sep. 27, 2022

(54) INFORMATION SENDING/RECEIVING METHOD AND APPARATUS

(71) Applicant: Huawei Technologies Co., Ltd., Shenzhen (CN)

(72) Inventors: Xiao Han, Shenzhen (CN); Chenlong Jia, Shenzhen (CN); Yan Xin, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 18 days.

(21) Appl. No.: 16/987,720

(22) Filed: Aug. 7, 2020

(65) Prior Publication Data
US 2020/0366455 A1    Nov. 19, 2020

Related U.S. Application Data

(63) Continuation of application No. PCT/CN2019/073108, filed on Jan. 25, 2019.

(30) Foreign Application Priority Data

Feb. 8, 2018 (CN) .................. 201810129057.X

(51) Int. Cl.
*H04L 5/14* (2006.01)
*H04L 27/26* (2006.01)
*H04W 72/04* (2009.01)

(52) U.S. Cl.
CPC ........ *H04L 5/1469* (2013.01); *H04L 27/2657* (2013.01); *H04W 72/0446* (2013.01)

(58) Field of Classification Search
CPC ..... H04L 5/0053; H04L 5/14; H04W 72/0446
See application file for complete search history.

(56) References Cited

U.S. PATENT DOCUMENTS 6,744,697 B2  6/2004  Mitra et al.
2006/0007896 A1  1/2006  Grieco
(Continued)

FOREIGN PATENT DOCUMENTS

CN  1474525 A  2/2004
CN  1929337 A  3/2007
(Continued)

OTHER PUBLICATIONS

Huang, G., et al., "Comment Resolution: CID 3085, 3221, 3310, 3505, 3506, 3549", doc.: IEEE 802.11-18/1890 r1, IEEE P802.11, Wireless LANs, Nov. 2018, 6 Pages.
(Continued)

*Primary Examiner* — Ayaz R Sheikh
*Assistant Examiner* — Debebe A Asefa
(74) *Attorney, Agent, or Firm* — Slater Matsil, LLP

(57) ABSTRACT

Embodiments of this application relate to the communications field, and in particular, to an information sending/receiving method and apparatus in the communications field. The information receiving method includes: determining an information receiving time based on any two of a time division duplex sector sweep acknowledgement frame count index, a count index, and a time division duplex sector sweep frame count index, duration of a time division duplex sector sweep frame, and duration of a time division duplex sector sweep acknowledgement frame; and receiving information at the determined information receiving time. According to the information receiving/sending method provided in the embodiments of this application, the information sending apparatus can send information at an accurate information sending time, the information receiving apparatus can receive the information at an accurate information receiving time, and system communication can be normally performed.

15 Claims, 8 Drawing Sheets

(56) References Cited

U.S. PATENT DOCUMENTS

| | | | |
|---|---|---|---|
| 2015/0381326 | A1 | 12/2015 | Struhsaker et al. |
| 2019/0222995 | A1* | 7/2019 | Abouelseoud ........ H04W 8/005 |

FOREIGN PATENT DOCUMENTS

| | | | |
|---|---|---|---|
| CN | 1972232 | A | 5/2007 |
| CN | 101087168 | A | 12/2007 |
| CN | 101090572 | A | 12/2007 |
| CN | 101635926 | A | 1/2010 |
| CN | 103312474 | A | 9/2013 |
| CN | 103597771 | A | 2/2014 |
| CN | 104767582 | A | 7/2015 |
| JP | H0591080 | A | 4/1993 |
| WO | 2017067378 | A1 | 4/2017 |
| WO | WO-2019014041 | A1 * | 1/2019 ............... H04B 7/06 |

OTHER PUBLICATIONS

Han, T., et al., "MU Beamforming for mmWave Distributed Network", doc.: IEEE 802.11-18/0175r1, Jan. 10, 2018, 16 Pages.

Han, T., et al., "Draft text for additional Beamforming procedures for mmWave Distributed Network", IEEE P802.11 Wireless LANs, Mar. 7, 2018, 42 Pages.

Kedem, O., et al., "Beamforming for mmWave Distributed Network", IEEE P802.11 Wireless LANs, doc.: IEEE 802.11-yy/xxxxr03, Jan. 16, 2018, 28 Pages.

"Part 11: Wireless LAN Medium Access Control (MAC) and Physical Layer (PHY) Specifications,Amendment 3: Enhancements for Very High Throughput in the 60 GHz Band," IEEE Standard for Information Technology—Telecommunications and Information Exchange Between Systems Local and Metropolitan Area Networks—Specific Requirements, IEEE Computer Society, Oct. 19, 2012, 628 pages.

"P802.11ay/D0.35, Draft Standard for Information Technology Telecommunications and Information Exchange Between Systems Local and Metropolitan Area Networks Specific Requirements Part 11: Wireless LAN Medium Access Control (MAC) and Physical Layer(PHY) Specifications" Amendment 7: Enhanced throughput for operation in license-exempt bands above 45 GHz, LAN/MAN Standards Committee of the IEEE Computer Society, May 2017, 256 pages.

* cited by examiner

INFORMATION SENDING/RECEIVING METHOD AND APPARATUS

CROSS-REFERENCE TO RELATED APPLICATIONS

This application is a continuation of International Application No. PCT/CN2019/073108, filed on Jan. 25, 2019, which claims priority to Chinese Patent Application No. 201810129057.X, filed on Feb. 8, 2018. The disclosures of the aforementioned applications are hereby incorporated by reference in their entireties.

TECHNICAL FIELD

Embodiments of this application relate to the communications field, and in particular, to an information sending/receiving method and apparatus in the communications field.

BACKGROUND

In many communication scenarios, one access point/site needs to connect to and communicate with a plurality of access points/sites at the same time. To enable that the access point/site efficiently communicate with the plurality of access points/sites connected to the access point/site, a size of a frame sent by the access point/site varies with a quantity of the plurality of access points/sites connected to the access point/site.

In the prior art, when one access point/site communicates with a plurality of access points/sites, many communication parameters are calculated in consideration by default that a size of a frame sent by the access point/site is constant, and a factor that the size of the frame sent by the access point/site varies is not considered. Consequently, the communication parameters calculated by using the prior art are inaccurate, and the inaccurate communication parameters affect normal communication of a communications system.

SUMMARY

Embodiments of this application provide an information receiving/sending method, by using which an accurate communication parameter can be obtained.

According to a first aspect, an embodiment of this application provides an information receiving method, including: determining an information receiving time, and receiving information at the determined information receiving time.

Further, the determining an information receiving time includes: determining the information receiving time based on any two of a time division duplex sector sweep acknowledgement frame count index, a count index, and a time division duplex sector sweep frame count index, duration of a time division duplex sector sweep frame, and duration of a time division duplex sector sweep acknowledgement frame.

Further, the determining an information receiving time includes: the information receiving time=a preset offset−(duration occupied by frames sent in a time period+a total interframe spacing), where the preset offset is a preset value, the duration occupied by frames sent in a time period is a partial time length and/or a total time length occupied by one type of frames or a plurality of types of frames that are sent in a time period, and the total interframe spacing is a partial time length and/or a total time length occupied by spacings between one type of frames or a plurality of types of frames that are sent in a time period.

In a first embodiment of the first aspect, the information is a time division duplex sector sweep feedback frame, and the determining a receiving time of the time division duplex sector sweep feedback frame is specifically: the receiving time of the time division duplex sector sweep feedback frame=a responder feedback offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the responder feedback offset is a value of a Responder Feedback Offset subfield in one or more time division duplex sector sweep frames, the one or more time division duplex sector sweep frames have a same transmitter (TX) sector identifier (ID), and the one or more time division duplex sector sweep frames are sent in a time division duplexing (TDD) slot, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a physical (PHY) layer conformance procedure protocol data unit (PPDU) corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a second embodiment of the first aspect, the information is a time division duplex sector sweep acknowledgement frame, and the determining a receiving time of the time division duplex sector sweep acknowledgement frame is specifically: the receiving time of the time division duplex sector sweep acknowledgement frame=an initiator acknowledgement offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the initiator acknowledgement offset is a value of an Initiator Ack Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a third embodiment of the first aspect, the information is an initiator announce frame, and the determining a receiving time of the initiator announce frame is specifically: the receiving time of the initiator announce frame=an initiator transmit offset−[the time division duplex sector sweep acknowledgement frame count index*the duration of the time division duplex sector sweep acknowledgement frame+ (the count index+1−the time division duplex sector sweep acknowledgement frame count index)*the duration of the time division duplex sector sweep frame+the count index*a short beamforming interframe spacing], where the initiator transmit offset is a value of an Initiator Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a fourth embodiment of the first aspect, the information is a responder announce frame, and the determining a receiving time of the responder announce frame is specifically: the receiving time of the responder announce frame=a responder transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the responder transmit offset is a value of a Responder Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

According to a second aspect, an embodiment of this application provides an information sending method, including: determining an information sending time, and sending information at the determined information sending time.

Further, the determining an information sending time includes: determining the information sending time based on any two of a time division duplex sector sweep acknowledgement frame count index, a count index, and a time division duplex sector sweep frame count index, duration of a time division duplex sector sweep frame, and duration of a time division duplex sector sweep acknowledgement frame.

Further, the determining an information sending time includes: the information sending time=a preset offset−(duration occupied by frames sent in a time period+a total interframe spacing), where the preset offset is a preset value, the duration occupied by frames sent in a time period is a partial time length and/or a total time length occupied by one type of frames or a plurality of types of frames that are sent in a time period, and the total interframe spacing is a partial time length and/or a total time length occupied by spacings between one type of frames or a plurality of types of frames that are sent in a time period.

In a first embodiment of the second aspect, the information is a time division duplex sector sweep feedback frame, and the determining a sending time of the time division duplex sector sweep feedback frame is specifically: the sending time of the time division duplex sector sweep feedback frame=a responder feedback offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the responder feedback offset is a value of a Responder Feedback Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a second embodiment of the second aspect, the information is a time division duplex sector sweep acknowledgement frame, and the determining a sending time of the time division duplex sector sweep acknowledgement frame is specifically: the sending time of the time division duplex sector sweep acknowledgement frame=an initiator acknowledgement offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the initiator acknowledgement offset is a value of an Initiator Ack Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a third embodiment of the second aspect, the information is an initiator announce frame, and the determining a sending time of the initiator announce frame is specifically: the sending time of the initiator announce frame=an initiator transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the initiator transmit offset is a value of an Initiator Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a fourth embodiment of the second aspect, the information is a responder announce frame, and the determining a sending time of the responder announce frame is specifically: the sending time of the responder announce frame=a responder transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the responder transmit offset is a value of a Responder Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

According to a third aspect, an embodiment of this application provides an information receiving apparatus, including: a processing module, configured to determine an information receiving time, and a transceiver module, configured to receive information at the determined information receiving time.

Further, the determining an information receiving time includes: determining the information receiving time based on any two of a time division duplex sector sweep acknowledgement frame count index, a count index, and a time division duplex sector sweep frame count index, duration of a time division duplex sector sweep frame, and duration of a time division duplex sector sweep acknowledgement frame.

In a first embodiment of the third aspect, the information is a time division duplex sector sweep feedback frame, and the determining a receiving time of the time division duplex sector sweep feedback frame is specifically: the receiving time of the time division duplex sector sweep feedback frame=a responder feedback offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the responder feedback offset is a value of a Responder Feedback Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a second embodiment of the third aspect, the information is a time division duplex sector sweep acknowledgement frame, and the determining a receiving time of the time division duplex sector sweep acknowledgement frame is specifically: the receiving time of the time division duplex sector sweep acknowledgement frame=an initiator acknowledgement offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the initiator acknowledgement offset is a value of an Initiator Ack Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a third embodiment of the third aspect, the information is an initiator announce frame, and the determining a receiving time of the initiator announce frame is specifically: the receiving time of the initiator announce frame=an initiator transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the initiator transmit offset is a value of an Initiator Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a fourth embodiment of the third aspect, the information is a responder announce frame, and the determining a receiving time of the responder announce frame is specifically: the receiving time of the responder announce frame=a responder transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the responder transmit offset is a value of a Responder Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

According to a fourth aspect, an embodiment of this application provides an information sending apparatus, including: a processing module, configured to determine an information sending time, and a transceiver module, configured to send information at the determined information sending time.

Further, the determining an information sending time includes: determining the information sending time based on any two of a time division duplex sector sweep acknowledgement frame count index, a count index, and a time division duplex sector sweep frame count index, duration of a time division duplex sector sweep frame, and duration of a time division duplex sector sweep acknowledgement frame.

In a first embodiment of the fourth aspect, the information is a time division duplex sector sweep feedback frame, and the determining a sending time of the time division duplex sector sweep feedback frame is specifically: the sending time of the time division duplex sector sweep feedback frame=a responder feedback offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the responder feedback offset is a value of a Responder Feedback Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a second embodiment of the fourth aspect, the information is a time division duplex sector sweep acknowledgement frame, and the determining a sending time of the time division duplex sector sweep acknowledgement frame is specifically: the sending time of the time division duplex sector sweep acknowledgement frame=an initiator acknowledgement offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the initiator acknowledgement offset is a value of an Initiator Ack Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a third embodiment of the fourth aspect, the information is an initiator announce frame, and the determining a sending time of the initiator announce frame is specifically: the sending time of the initiator announce frame=an initiator transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the initiator transmit offset is a value of an Initiator Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

In a fourth embodiment of the fourth aspect, the information is a responder announce frame, and the determining a sending time of the responder announce frame is specifically: the sending time of the responder announce frame=a responder transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], where the responder transmit offset is a value of a Responder Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and the one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

According to a fifth aspect, an embodiment of this application provides an information receiving device. The information receiving device includes a transceiver and a processor, and optionally, the information receiving device may further include a memory. The processor is configured to: control a receiver to receive a signal or control a transmitter to send a signal, and execute an instruction to implement the method according to any one of the first aspect or the possible embodiments of the first aspect. The memory is configured to store the instruction. The transceiver is configured to send/receive a signal.

According to a sixth aspect, an embodiment of this application provides an information sending device. The information sending device includes a transceiver and a processor, and optionally, the information sending device may further include a memory. The processor is configured to: control a receiver to receive a signal or control a transmitter to send a signal, and execute an instruction to implement the method according to any one of the second aspect or the possible embodiments of the second aspect. The memory is configured to store the instruction. The transceiver is configured to send/receive a signal.

According to a seventh aspect, an embodiment of this application provides a computer readable medium, configured to store a computer program, and the computer program includes an instruction used to perform the method according to any one of the first aspect or the possible implementations of the first aspect.

According to an eighth aspect, an embodiment of this application provides a computer readable medium, configured to store a computer program, and the computer program includes an instruction used to perform the method according to any one of the second aspect or the possible implementations of the second aspect.

According to a ninth aspect, an embodiment of this application provides a computer program. The computer program stores an instruction used to perform the method according to any one of the first aspect or the possible implementations of the first aspect.

According to a tenth aspect, an embodiment of this application provides a computer program. The computer program stores an instruction used to perform the method according to any one of the second aspect or the possible implementations of the second aspect.

According to an eleventh aspect, an embodiment of this application provides an information receiving chip. The information receiving chip includes a processor and a transceiver interface. The transceiver interface and the processor communicate with each other by using an internal connection path. The processor performs the method according to any possible embodiment of the first aspect, to control a receiving interface to receive a signal, and control a sending interface to send a signal.

According to a twelfth aspect, an embodiment of this application provides an information sending chip. The information sending chip includes a processor and a transceiver interface. The transceiver interface and the processor communicate with each other by using an internal connection path. The processor performs the method according to any possible embodiment of the second aspect, to control a receiving interface to receive a signal, and control a sending interface to send a signal.

DETAILED DESCRIPTION OF ILLUSTRATIVE EMBODIMENTS

The following describes technical solutions in embodiments of this application with reference to the accompanying drawings in the embodiments of this application.

It should be understood that, the embodiments of this application may be applied to various communications systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a fifth generation (5G) communications system.

It should be further understood that the embodiments of this application may be further applied to various non-orthogonal multiple access technology-based communications systems, for example, a sparse code multiple access (SCMA) system. Certainly, SCMA may also be referred to as another name in the communications field. Further, the technical solutions in the embodiments of this application may be applied to a multi-carrier transmission system using the non-orthogonal multiple access technology, for example, an orthogonal frequency division multiplexing (OFDM) system using the non-orthogonal multiple access technology, a filter bank multi-carrier (FBMC) system, a generalized frequency division multiplexing (GFDM) system, and a filtered-orthogonal frequency division multiplexing (filtered-OFDM, F-OFDM) system.

It should be further understood that, the embodiments of this application may be applied to an LTE system and a subsequent evolved system such as 5G or other wireless communications systems using various radio access technologies, for example, systems using access technologies such as code division multiple access, frequency division multiple access, time division multiple access, orthogonal frequency division multiple access, and single-carrier frequency division multiple access, and particularly applicable to a scenario in which a channel information feedback is required and/or a two-stage precoding technology is used, for example, a wireless network using a massive multiple input multiple output (MIMO) technology or a wireless network using a distributed antenna technology.

It should be further understood that the embodiments of this application may also be applied to a mesh-distributed network system. The mesh-distributed network system includes a plurality of access points and a plurality of sites. One access point or site communicates with a plurality of other access points or sites.

Figure 1:
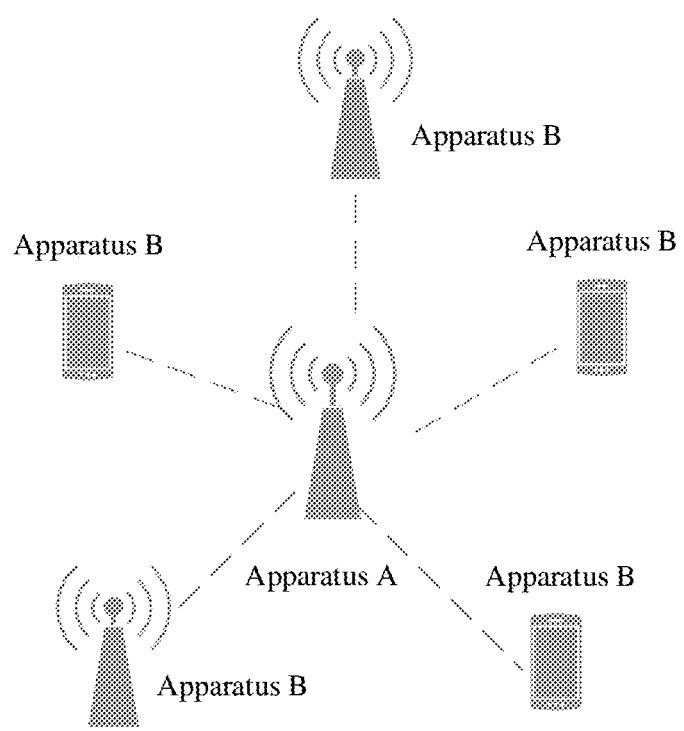
FIG. 1 is a schematic diagram of an application scenario of a network architecture according to an embodiment of this application.
Figure 2:
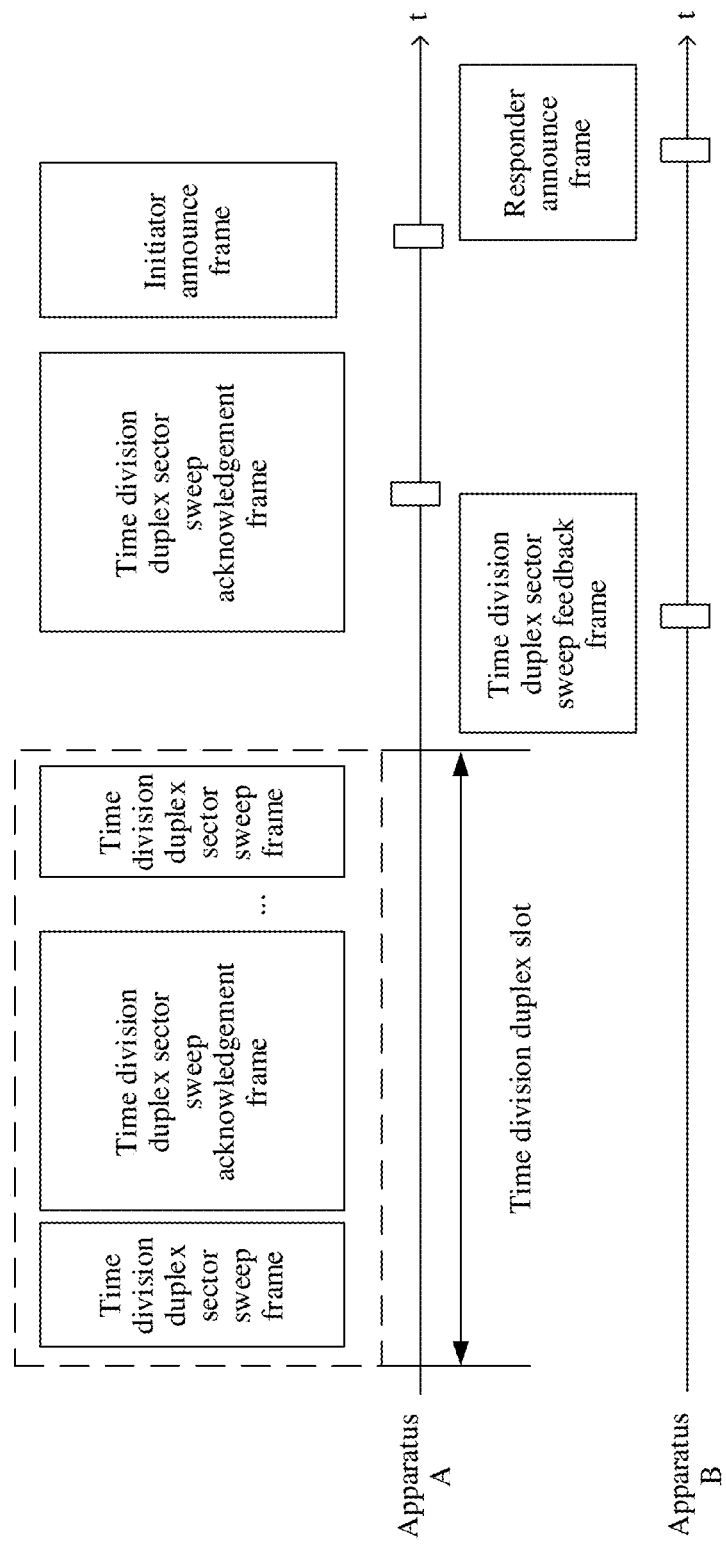
FIG. 2 is a schematic diagram of an application scenario of time according to an embodiment of this application.

FIG. 1 is a schematic diagram of an application scenario of a network architecture according to an embodiment of this application. As shown in FIG. 1, an apparatus A communicates with at least one apparatus B. To improve efficiency of beamforming training performed by the apparatus A with the at least one apparatus B, duration of a time division duplex sector sweep frame (TDD SSW group frame) sent by the apparatus A is a variable value, and is no longer a fixed value. In addition, in an actual communication process, the apparatus A sends a TDD SSW group frame in a TDD slot for beamforming training, and further sends a time division duplex sector sweep acknowledgement frame (Time Division Duplex Sector Sweep Ack frame, TDD SSW Ack frame), to acknowledge a time division duplex sector sweep feedback frame (TDD SSW Feedback frame) fed back by the apparatus B. As shown in FIG. 2, the apparatus A sends a TDD SSW group frame and a TDD SSW ACK frame in a time division duplex slot (TDD slot). The TDD SSW group frame in the TDD slot in FIG. 2 is used for beamforming training, and the TDD SSW ACK frame in the TDD slot in FIG. 2 is used to acknowledge a TDD SSW feedback frame previously fed back by the apparatus B (where the TDD SSW feedback frame previously fed back by the apparatus B is not shown in FIG. 2). When duration of the TDD SSW group frame sent by the apparatus A changes and the TDD SSW group frame and the TDD SSW ACK frame are transmitted in a same TDD slot, a sending/receiving time of the TDD SSW feedback frame, a sending/receiving time of the TDD SSW ACK frame, a sending/receiving time of an initiator announce frame, and a sending/receiving time of a responder announce frame that are calculated by using the prior art are all inaccurate. Consequently, the communications system cannot perform normal communication.

To resolve the foregoing technical problem, the embodiments of this application provide two solutions.

1. The TDD SSW group frame and the TDD SSW ACK frame are not allowed to be transmitted in a same TDD slot. In this case, the foregoing time parameters may be calculated by using the prior art.

2. Technical solutions provided below in the embodiments of this application are used.

In the prior art, duration of a TDD SSW frame, a TDD SSW feedback frame, and a TDD SSW ACK frame is equal. In the embodiments of this application, duration of a TDD SSW group frame is not equal to duration of a TDD SSW feedback frame and a TDD SSW ACK frame.

FIG. 2 is a schematic diagram of an application scenario of time according to an embodiment of this application. FIG. 2 shows only a communication procedure between the apparatus A and one apparatus B. Communication procedures between the apparatus A and other apparatuses B are similar to this, and details are not described below again.

As shown in FIG. 2, the apparatus A transmits a TDD SSW group frame and/or a TDD SSW ACK frame in a TDD slot. The TDD SSW group frame is used for beamforming training performed by the apparatus A with at least one apparatus B (such as the at least one apparatus B shown in FIG. 1), and the TDD SSW ACK frame is used by the apparatus A to acknowledge a TDD SSW feedback frame previously fed back by an apparatus B (such as an apparatus B shown in FIG. 1) (where the TDD SSW feedback frame previously fed back by the apparatus B is not shown in FIG. 2).

As shown in FIG. 2, at a time point, the apparatus B feeds back a TDD SSW feedback frame to the apparatus A, where the TDD SSW feedback frame is used by the apparatus B to feed back the TDD SSW group frame received by the apparatus B.

As shown in FIG. 2, at a time point, the apparatus A sends a TDD SSW ACK frame to the apparatus B, where the TDD SSW ACK frame is used by the apparatus A to acknowledge a TDD SSW feedback frame received by the apparatus A. As shown in FIG. 2, at a time point, the apparatus A sends an initiator announce frame to the apparatus B, where the initiator announce frame is used to exchange some management information, for example, slot allocation and scheduling information and/or beam sweeping result information.

As shown in FIG. 2, at a time point, the apparatus B sends a responder announce frame to the apparatus A, where the responder announce frame is used to exchange some management information, for example, slot allocation and scheduling information and/or beam sweeping result information.

The embodiments of this application provide an information receiving/sending method and apparatus, so that the apparatus A/apparatus B can receive/send the foregoing four types of frames (the TDD SSW feedback frame, the TDD SSW ACK frame, the initiator announce frame, and the responder announce frame) at accurate time points.

Figure 3:
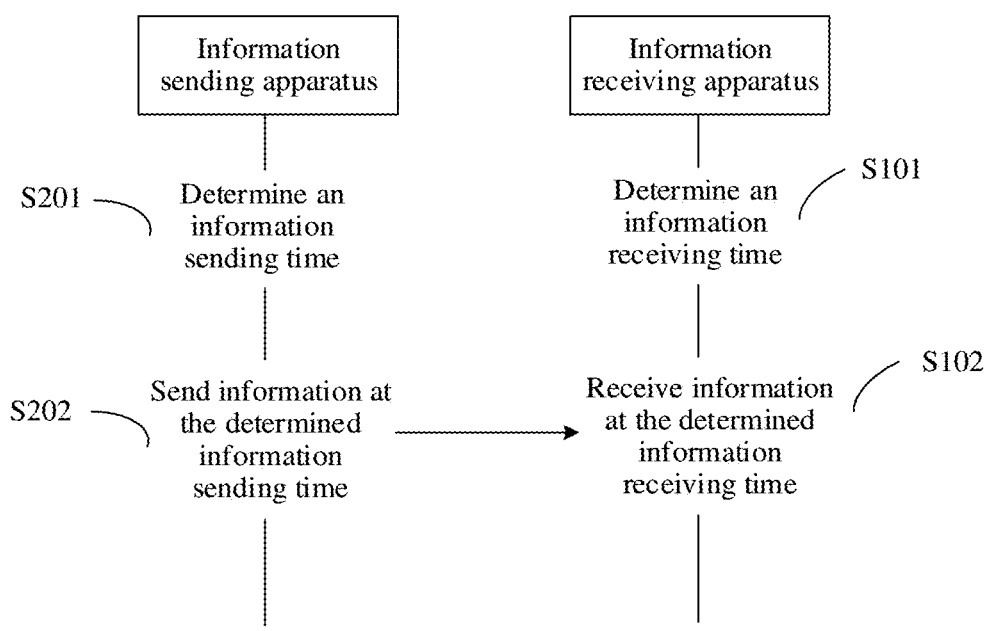
FIG. 3 is a flowchart of a method according to an embodiment of this application.

FIG. 3 is a flowchart of a method according to an embodiment of this application. As shown in FIG. 3, an information receiving method includes the following steps.

S101. An information receiving apparatus determines an information receiving time.

In a first possible implementation, S101 of determining, by an information receiving apparatus, an information receiving time includes: determining the information receiving time based on any two of a time division duplex sector sweep acknowledgement frame count index, a count index, and a time division duplex sector sweep frame count index, duration of a time division duplex sector sweep frame, and duration of a time division duplex sector sweep acknowledgement frame.

In a Wi-Fi standard, the time division duplex sector sweep acknowledgement frame count index is represented by AckCountIndex, the count index is represented by CountIndex, the time division duplex sector sweep frame count index is represented by SswCountIndex, the duration of the time division duplex sector sweep frame is represented by TXTIME(TDD SSWgroup), and the duration of the time division duplex sector sweep acknowledgement frame is represented by TXTIME(TDD Ack).

Similarly, in the Wi-Fi standard, a short beamforming interframe spacing is represented by SBIFS.

In this embodiment of this application, a quantity of time division duplex sector sweep acknowledgement frames+a quantity of time division duplex sector sweep frames=a total quantity of frames. The time division duplex sector sweep acknowledgement frame count index is used to count the quantity of time division duplex sector sweep acknowledgement frames, and may start from 0 or may start from 1. The time division duplex sector sweep frame count index is used to count the quantity of time division duplex sector sweep frames, and may start from 0 or may start from 1. In this case, the count index is used to count the total quantity of frames, and may start from 0 or 1. However, regardless of whether the time division duplex sector sweep acknowledgement frame count index/the time division duplex sector sweep frame count index starts from 0 or 1, relationships among the time division duplex sector sweep acknowledgement frame count index, the time division duplex sector sweep frame count index, and the count index meet that the quantity of time division duplex sector sweep acknowledgement frames+the quantity of time division duplex sector sweep frames=the total quantity of frames.

Further, as shown in FIG. 2, S101 includes: determining, by an apparatus A, a receiving time of a TDD SSW feedback frame based on any two of a time division duplex sector sweep acknowledgement frame count index, a count index, and a time division duplex sector sweep frame count index, duration of a time division duplex sector sweep frame, and duration of a time division duplex sector sweep acknowledgement frame. A method for determining, by the apparatus A, the receiving time of the TDD SSW feedback frame specifically includes but is not limited to the following three manners:

(1) The receiving time of the TDD SSW feedback frame=a responder feedback offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing]. (Formula 1-1-1)

The responder feedback offset is a value of a Responder Feedback Offset subfield in one or more TDD SSW group frames, the one or more TDD SSW group frames have a same TX sector ID, and the one or more TDD SSW group frames are sent in a TDD slot.

In a Wi-Fi standard, the responder feedback offset is represented by ResponderFeedbackOffset.

Figure 4:
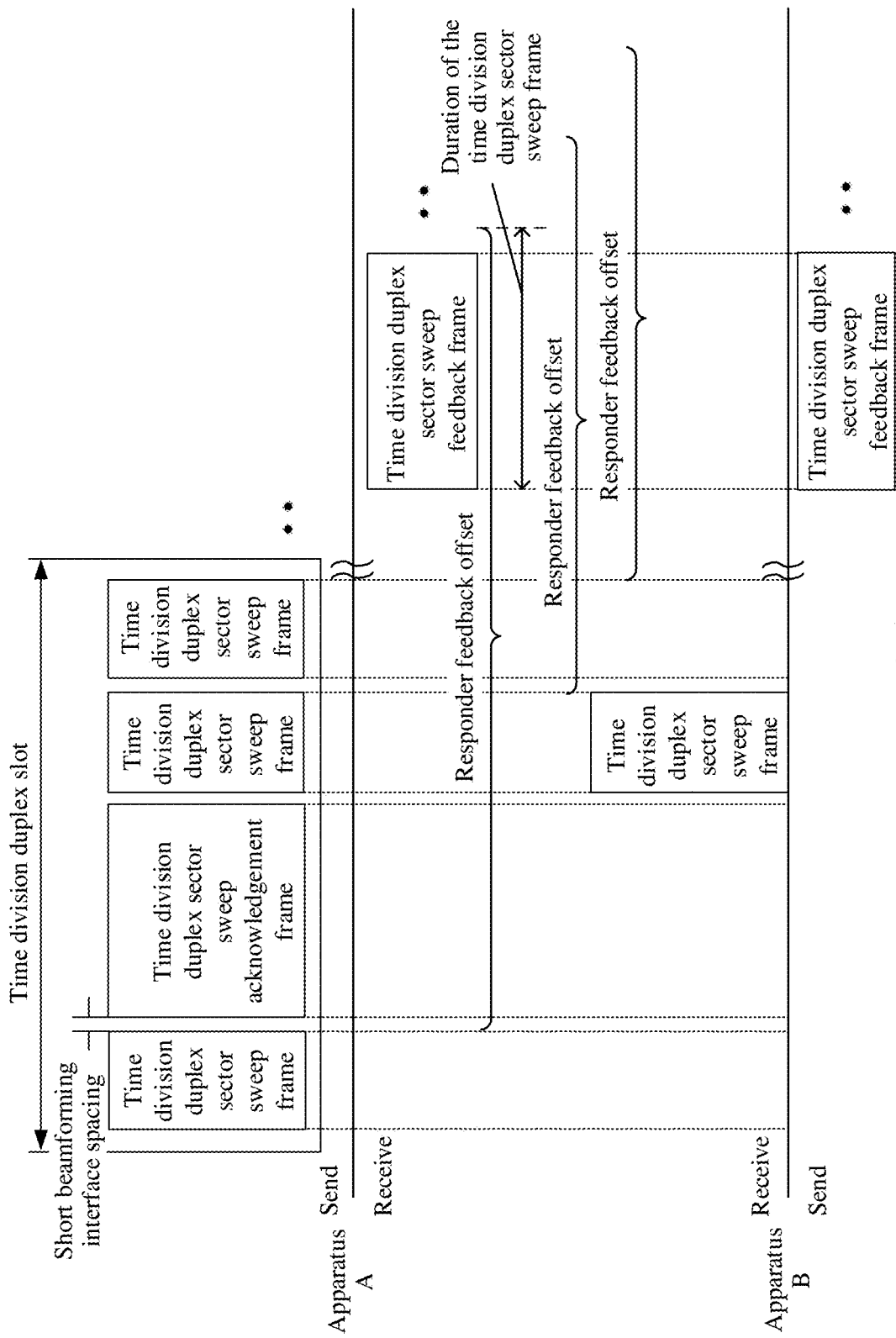
FIG. 4 is a schematic diagram of a setting of ResponderFeedbackOffset in a first possible implementation according to an embodiment of this application.

As shown in FIG. 4, a value of ResponderFeedbackOffset is duration, and the duration is set to a sum of duration from a time when the apparatus A finishes sending a first TDD SSW group frame/TDD SSW ACK frame to a start time when an apparatus B feeds back a TDD SSW feedback frame, and duration of a TDD SSW group frame. In addition, values of Responder Feedback Offset fields in all TDD SSW frames are the same, that is, a value of a Responder Feedback Offset field in each subsequent TDD SSW frame is set to the sum of the "duration from the time when the apparatus A finishes sending the first TDD SSW group frame/TDD SSW ACK frame to the start time when the apparatus B feeds back the TDD SSW feedback frame, and the duration of the TDD SSW group frame".

The duration of the TDD SSW group frame is duration of a PHY layer PPDU corresponding to the TDD SSW group frame. Various frames described in this embodiment of this application are media access control (MAC) layer frames. Duration of a MAC layer frame described in this embodiment of this application is duration of a PHY layer PPDU corresponding to the MAC layer frame.

The time division duplex sector sweep acknowledgement frame count index is a quantity of TDD SSW ACK frames that have been sent by the apparatus A before the apparatus B receives a current TDD SSW group frame, and the one or more TDD SSW ACK frames are sent in a TDD slot, and the time division duplex sector sweep acknowledgement frame count index≥0 and is an integer.

The duration of the time division duplex sector sweep acknowledgement frame is duration of a PHY layer PPDU corresponding to the TDD SSW ACK frame.

The count index is a total count value of frames sent by the apparatus A in a TDD slot, and the frames include the TDD SSW group frame and the TDD SSW ACK frame, and the count index 0 and is an integer.

The duration of the time division duplex sector sweep frame is duration of a PHY layer PPDU corresponding to the TDD SSW group frame.

The short beamforming interframe spacing is a spacing between adjacent frames in frames sent by the apparatus A in a TDD slot, where the frames include the TDD SSW group frame and the TDD SSW ACK frame.

The foregoing formula may be expressed as follows:

The receiving time of the TDD SSW feedback frame=ResponderFeedbackOffset−
[AckCountIndex*TXTIME(TDD Ack)+
(CountIndex+1−AckCountIndex)*TXTIME
(TDD SSWgroup)+CountIndex*SBIFS].

ResponderFeedbackOffset is a value of a Responder Feedback Offset subfield in one or more TDD SSW group frames, the one or more TDD SSW group frames have a same TX sector ID, and the one or more TDD SSW group frames are sent in a TDD slot.

AckCountIndex is a quantity of TDD SSW ACK frames that have been sent by the apparatus A before the apparatus B receives a current TDD SSW group frame, and the one or more TDD SSW ACK frames are sent in a TDD slot, and the AckCountIndex≥0 and is an integer.

TXTIME(TDD Ack) is duration of a PHY layer PPDU corresponding to the TDD SSW ACK frame.

CountIndex is a total count value of frames sent by the apparatus A in a TDD slot, and the frames include the TDD SSW group frame and the TDD SSW ACK frame, and CountIndex≥0 and is an integer.

TXTIME(TDD SSWgroup) is duration of a PHY layer PPDU corresponding to the TDD SSW group frame.

SBIFS is a spacing between adjacent frames in frames sent by the apparatus A in a TDD slot, where the frames include the TDD SSW group frame and the TDD SSW ACK frame.

(2) The receiving time of the TDD SSW feedback frame=a responder feedback offset−[(the count index−the time division duplex sector sweep frame count index)*the duration of the time division duplex sector sweep acknowledgement frame+(the time division duplex sector sweep frame count index+1)*the duration of the time division duplex sector sweep frame+the count index*a short beamforming interframe spacing]. (Formula 1-1-2)

Meanings and value ranges of the parameters in the formula 1-1-2 are the same as the meanings and value ranges of the corresponding parameters in the formula 1-1-1, and a difference lies in that the time division duplex sector sweep frame count index is a count value of time division duplex sector sweep frames sent by the apparatus A in a TDD slot, and the time division duplex sector sweep frame count index≥0.

The foregoing formula may be expressed as follows:

The receiving time of the TDD SSW feedback frame=ResponderFeedbackOffset−[(CountIndex−SswCountIndex)*TXTIME(TDD Ack)+(SswCountIndex+1)*TXTIME(TDD SSWgroup)+CountIndex*SBIFS)].

(3) The receiving time of the TDD SSW feedback frame=a responder feedback offset−[the time division duplex sector sweep acknowledgement frame count index*the duration of the time division duplex sector sweep acknowledgement frame+(the time division duplex sector sweep frame count index+1)*the duration of the time division duplex sector sweep frame+(the time division duplex sector sweep acknowledgement frame count index+the time division duplex sector sweep frame count index)*a short beamforming interframe spacing]. (Formula 1-1-3)

Meanings and value ranges of the parameters in the formula 1-1-3 are the same as the meanings and value ranges of the corresponding parameters in the formula 1-1-1, and a difference lies in that the time division duplex sector sweep frame count index is a count value of time division duplex sector sweep frames sent by the apparatus A in a TDD slot, and the time division duplex sector sweep frame count index≥0.

The foregoing formula may be expressed as follows:

The receiving time of the TDD SSW feedback frame=ResponderFeedbackOffset−[AckCountIndex*TXTIME(TDD Ack)+(SswCountIndex+1)*TXTIME(TDD SSWgroup)+(SswCountIndex+AckCountIndex)*SBIFS].

In the foregoing three manners, CountIndex≥0 and is an integer, and AckCountIndex≥0 and is an integer. If CountIndex 1 and is an integer, and AckCountIndex≥0 and is an integer, the method for determining, by the apparatus A, the receiving time of the TDD SSW feedback frame includes but is not limited to the following three manners. It should be understood that in the following three manners, meanings of parameters in the formulas are the same as those described above, and a difference lies in that CountIndex≥1 and is an integer, and AckCountIndex≥0 and is an integer.

That is, when CountIndex≥1 and is an integer, and AckCountIndex≥0 and is an integer, the method for determining the receiving time of the TDD SSW feedback frame includes the following manners:

(4) The receiving time of the TDD SSW feedback frame=a responder feedback offset−[(the time division duplex sector sweep acknowledgement frame count index*the duration of the time division duplex sector sweep acknowledgement frame+(the count index−the time division duplex sector sweep acknowledgement frame count index)*the duration of the time division duplex sector sweep frame+(the count index−1)*a short beamforming interframe spacing]. (Formula 1-1-4)

Meanings and value ranges of the parameters in the formula 1-1-4 are the same as the meanings and value ranges of the corresponding parameters in the formula 1-1-1.

The foregoing formula may be expressed as follows.

The receiving time of the TDD SSW feedback frame=ResponderFeedbackOffset−[AckCountIndex*TXTIME(TDD Ack)+(CountIndex−AckCountIndex)*TXTIME(TDD SSWgroup)+(CountIndex−1)*SBIFS].

(5) The receiving time of the TDD SSW feedback frame=a responder feedback offset−[(the count index−the time division duplex sector sweep frame count index)*the duration of the time division duplex sector sweep acknowledgement frame+the time division duplex sector sweep frame count index*the duration of the time division duplex sector sweep frame+(the count index−1)*a short beamforming interframe spacing]. (Formula 1-1-5)

Meanings and value ranges of the parameters in the formula 1-1-5 are the same as the meanings and value ranges of the corresponding parameters in the formula 1-1-2.

The foregoing formula may be expressed as follows:

The receiving time of the TDD SSW feedback frame=ResponderFeedbackOffset−[(CountIndex−SswCountIndex)*TXTIME(TDD Ack)+SswCountIndex*TXTIME(TDD SSWgroup)+(CountIndex−1)*SBIFS].

(6) The receiving time of the TDD SSW feedback frame=a responder feedback offset−[the time division duplex sector sweep acknowledgement frame count index*the duration of the time division duplex sector sweep acknowledgement frame+the time division duplex sector sweep frame count index*the duration of the time division duplex sector sweep frame+(the time division duplex sector sweep acknowledgement frame count index+the time division duplex sector sweep frame count index−1)*a short beamforming interframe spacing]. (Formula 1-1-6)

Meanings and value ranges of the parameters in the formula 1-1-6 are the same as the meanings and value ranges of the corresponding parameters in the formula 1-1-3.

The foregoing formula may be expressed as follows:

The receiving time of the TDD SSW feedback frame=ResponderFeedbackOffset−[AckCountIndex*TXTIME(TDD Ack)+(SswCountIndex)*TXTIME(TDD SSWgroup)+(SswCountIndex+AckCountIndex−1)*SBIFS].

In the foregoing formulas 1-1-4 to 1-1-6, CountIndex≥1 and is an integer, and AckCountIndex≥0 and is an integer. It should be understood that, in this embodiment of this application, CountIndex may be numbered from 0 (that is, CountIndex≥0 and is an integer), or CountIndex may be numbered from 1 (that is, CountIndex≥1 and is an integer). In addition, AckCountIndex may be numbered from 0 (that is, AckCountIndex≥0 and is an integer), or AckCountIndex may be numbered from 1 (that is, AckCountIndex≥1 and is an integer). If CountIndex and AckCountIndex have different value ranges, the formulas have corresponding variations. For example, the formula 1-1-4 is a variation of the formula 1-1-1, the formula 1-1-5 is a variation of the formula 1-1-2, and the formula 1-1-6 is a variation of the formula 1-1-3. Apparently, if CountIndex and AckCountIndex have different value ranges, this embodiment of this application further includes other variations. Apparently, the other corresponding variations fall within the protection scope of this embodiment of this application, and a specific variation is not described herein.

Further, as shown in FIG. 2, S101 includes: determining, by an apparatus B, a receiving time of a TDD SSW ACK frame based on any two of a time division duplex sector sweep acknowledgement frame count index, a count index, and a time division duplex sector sweep frame count index, duration of a time division duplex sector sweep frame, and duration of a time division duplex sector sweep acknowledgement frame. A method for determining, by the apparatus B, the receiving time of the TDD SSW ACK frame specifically includes but is not limited to the following three manners:

(1) The receiving time of the TDD SSW ACK frame=an initiator acknowledgement offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing]. (Formula 1-2-1)

Meanings and value ranges of the parameters in the formula 1-2-1 are the same as the meanings and value ranges of the corresponding parameters in the formula 1-1-1, and a difference lies in that the initiator acknowledgement offset is a value of an Initiator Ack Offset subfield in one or more TDD SSW group frames, the one or more TDD SSW group frames have a same TX sector ID, and the one or more TDD SSW group frames are sent in a TDD slot.

In a Wi-Fi standard, the initiator acknowledgement offset is represented by InitiatorAckOffset.

The foregoing formula may be expressed as follows:

The receiving time of the TDD SSW ACK frame=InitiatorAckOffset−[AckCountIndex*TXTIME(TDD Ack)+(CountIndex+1−AckCountIndex)*TXTIME(TDD SSWgroup)+CountIndex*SBIFS].

(2) The receiving time of the TDD SSW ACK frame=an initiator acknowledgement offset−[(the count index−the time division duplex sector sweep frame count index)*the duration of the time division duplex sector sweep acknowledgement frame+(the time division duplex sector sweep frame count index+1)*the duration of the time division duplex sector sweep frame+the count index*a short beamforming interframe spacing]. (Formula 1-2-2)

Meanings and value ranges of the parameters in the formula 1-2-2 are the same as the meanings and value ranges of the corresponding parameters in the formula 1-1-2, and a difference lies in that the initiator acknowledgement offset is a value of an Initiator Ack Offset subfield in one or more TDD SSW group frames, the one or more TDD SSW group frames have a same TX sector ID, and the one or more TDD SSW group frames are sent in a TDD slot.

The foregoing formula may be expressed as follows:

The receiving time of the TDD SSW ACK frame=InitiatorAckOffset−[(CountIndex−SswCountIndex)*TXTIME(TDD Ack)+(Ssw-CountIndex+1)*TXTIME(TDD SSWgroup)+CountIndex*SBIFS].

(3) The receiving time of the TDD SSW ACK frame=an initiator acknowledgement offset−[the time division duplex sector sweep acknowledgement frame count index*the duration of the time division duplex sector sweep acknowledgement frame+(the time division duplex sector sweep frame count index+1)*the duration of the time division duplex sector sweep frame+(the time division duplex sector sweep acknowledgement frame count index+the time division duplex sector sweep frame count index)*a short beamforming interframe spacing]. (Formula 1-2-3)

Meanings and value ranges of the parameters in the formula 1-2-3 are the same as the meanings and value ranges of the corresponding parameters in the formula 1-1-3, and a difference lies in that the initiator acknowledgement offset is a value of an Initiator Ack Offset subfield in one or more TDD SSW group frames, the one or more TDD SSW group frames have a same TX sector ID, and the one or more TDD SSW group frames are sent in a TDD slot.

The foregoing formula may be expressed as follows:

The receiving time of the TDD SSW ACK frame=InitiatorAckOffset−[AckCountIndex*TXTIME(TDD Ack)+(Ssw-CountIndex+1)*TXTIME(TDD SSWgroup)+(SswCountIndex+AckCountIndex)*SBIFS].

In the foregoing three manners, CountIndex≥0 and is an integer, and AckCountIndex≥0 and is an integer. It should be understood that, in this embodiment of this application, CountIndex may be numbered from 0 (that is, CountIndex≥0 and is an integer), or CountIndex may be numbered from 1 (that is, CountIndex≥1 and is an integer). In addition, AckCountIndex may be numbered from 0 (that is, AckCountIndex≥0 and is an integer), or AckCountIndex may be numbered from 1 (that is, AckCountIndex≥1 and is an integer). Similarly, if CountIndex and AckCountIndex have different value ranges, the formula for determining, by the apparatus B, the receiving time of the TDD SSW ACK frame further includes other variations. Apparently, the other corresponding variations fall within the protection scope of this embodiment of this application, and a specific variation is not described herein.

Further, as shown in FIG. 2, S101 includes: determining, by an apparatus B, a receiving time of an initiator announce frame based on any two of a time division duplex sector sweep acknowledgement frame count index, a count index, and a time division duplex sector sweep frame count index, duration of a time division duplex sector sweep frame, and duration of a time division duplex sector sweep acknowledgement frame. A method for determining, by the apparatus B, the receiving time of the initiator announce frame specifically includes but is not limited to the following three manners:

(1) The receiving time of the initiator announce frame=an initiator transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing]. (Formula 1-3-1)

Meanings and value ranges of the parameters in the formula 1-3-1 are the same as the meanings and value ranges of the corresponding parameters in the formula 1-1-1. A difference lies in that the initiator transmit offset is a value of an Initiator Transmit Offset subfield when a value of an End of Training subfield in the TDD SSW ACK frame is 1.

In a Wi-Fi standard, the initiator transmit offset is represented by InitiatorTransmitOffset.

The foregoing formula may be expressed as follows:

The receiving time of the initiator announce
frame=InitiatorTransmitOffset−
[AckCountIndex*TXTIME(TDD Ack)+
(CountIndex+1−AckCountIdex)*TXTIME(TDD
SSWgroup)+CountIndex*SBIFS)].

(2) The receiving time of the initiator announce
frame=an initiator transmit offset−[(the count
index−the time division duplex sector sweep
frame count index)*the duration of the time
division duplex sector sweep acknowledgement
frame+(the time division duplex sector sweep
frame count index+1)*the duration of the time
division duplex sector sweep frame+the count
index*a short beamforming interframe spacing]. (Formula 1-3-2)

Meanings and value ranges of the parameters in the formula 1-3-2 are the same as the meanings and value ranges of the corresponding parameters in the formula 1-1-2. A difference lies in that the initiator transmit offset is a value of an Initiator Transmit Offset subfield when a value of an End of Training subfield in the TDD SSW ACK frame is 1.

The foregoing formula may be expressed as follows:

The receiving time of the initiator announce
frame=InitiatorTransmitOffset−[(CountIndex−
SswCountIndex)*TXTIME(TDD Ack)+(Ssw-
CountIndex+1)*TXTIME(TDD SSWgroup)+
CountIndex*SBIFS)].

(3) The receiving time of the initiator announce
frame=an initiator transmit offset−[the time
division duplex sector sweep acknowledgement
frame count index*the duration of the time
division duplex sector sweep acknowledgement
frame+(the time division duplex sector sweep
frame count index+1)*the duration of the time
division duplex sector sweep frame+(the time
division duplex sector sweep acknowledgement
frame count index+the time division duplex
sector sweep frame count index)*a short beam-
forming interframe spacing]. (Formula 1-3-3)

Meanings and value ranges of the parameters in the formula 1-3-3 are the same as the meanings and value ranges of the corresponding parameters in the formula 1-1-3. A difference lies in that the initiator transmit offset is a value of an Initiator Transmit Offset subfield when a value of an End of Training subfield in the TDD SSW ACK frame is 1.

The foregoing formula may be expressed as follows:

The receiving time of the initiator announce
frame=InitiatorTransmitOffset−
[AckCountIndex*TXTIME(TDD Ack)+(Ssw-
CountIndex+1)*TXTIME(TDD SSWgroup)+
(SswCountIndex+AckCountIndex)*SBIFS].

In the foregoing three manners, CountIndex≥0 and is an integer, and AckCountIndex≥0 and is an integer. It should be understood that, in this embodiment of this application, CountIndex may be numbered from 0 (that is, CountIndex≥0 and is an integer), or CountIndex may be numbered from 1 (that is, CountIndex≥1 and is an integer). In addition, AckCountIndex may be numbered from 0 (that is, Ack-CountIndex≥0 and is an integer), or AckCountIndex may be numbered from 1 (that is, AckCountIndex≥1 and is an integer). Similarly, if CountIndex and AckCountIndex have different value ranges, the formula for determining, by the apparatus B, the receiving time of the initiator announce frame further includes other variations. Apparently, the other corresponding variations fall within the protection scope of this embodiment of this application, and a specific variation is not described herein.

Further, as shown in FIG. 2, S101 includes: determining, by an apparatus A, a receiving time of a responder announce frame based on any two of a time division duplex sector sweep acknowledgement frame count index, a count index, and a time division duplex sector sweep frame count index, duration of a time division duplex sector sweep frame, and duration of a time division duplex sector sweep acknowledgement frame. A method for determining, by the apparatus A, the receiving time of the responder announce frame specifically includes but is not limited to the following three manners:

(1) The receiving time of the responder announce
frame=a responder transmit offset−[the time
division duplex sector sweep acknowledgement
frame count index*the duration of the time
division duplex sector sweep acknowledgement
frame+(the count index+1−the time division
duplex sector sweep acknowledgement frame
count index)*the duration of the time division
duplex sector sweep frame+the count index*a
short beamforming interframe spacing]. (Formula 1-4-1)

Meanings and value ranges of the parameters in the formula 1-4-1 are the same as the meanings and value ranges of the corresponding parameters in the formula 1-1-1. A difference lies in that the responder transmit offset is a value of a Responder Transmit Offset subfield when a value of an End of Training subfield in the TDD SSW ACK frame is 1.

In a Wi-Fi standard, the responder transmit offset is represented by ResponderTransmitOffset.

The foregoing formula may be expressed as follows:

The receiving time of the responder announce
frame=ResponderTransmitOffset−
[AckCountIndex*TXTIME(TDD Ack)+
(CountIndex+1−AckCountIdex)*TXTIME(TDD
SSWgroup)+CountIndex*SBIFS].

(2) The receiving time of the responder announce
frame=a responder transmit offset−[(the count
index−the time division duplex sector sweep
frame count index)*the duration of the time
division duplex sector sweep acknowledgement
frame+(the time division duplex sector sweep
frame count index+1)*the duration of the time
division duplex sector sweep frame+the count
index*a short beamforming interframe
spacing]. (Formula 1-4-2)

Meanings and value ranges of the parameters in the formula 1-4-2 are the same as the meanings and value ranges of the corresponding parameters in the formula 1-1-2. A difference lies in that the responder transmit offset is a value of a Responder Transmit Offset subfield when a value of an End of Training subfield in the TDD SSW ACK frame is 1.

The foregoing formula may be expressed as follows:

The receiving time of the responder announce
frame=ResponderTransmitOffset−[(CountIndex−
SswCountIndex)*TXTIME(TDD Ack)+(Ssw-
CountIndex+1)*TXTIME(TDD SSWgroup)+
CountIndex*SBIFS].

(3) The receiving time of the responder announce
frame=a responder transmit offset−[the time
division duplex sector sweep acknowledgement
frame count index*the duration of the time
division duplex sector sweep acknowledgement
frame+(the time division duplex sector sweep
frame count index+1)*the duration of the time division duplex sector sweep frame+(the time division duplex sector sweep acknowledgement frame count index+the time division duplex sector sweep frame count index)*a short beamforming interframe spacing]. (Formula 1-4-3)

Meanings and value ranges of the parameters in the formula 1-4-3 are the same as the meanings and value ranges of the corresponding parameters in the formula 1-1-3. A difference lies in that the responder transmit offset is a value of a Responder Transmit Offset subfield when a value of an End of Training subfield in the TDD SSW ACK frame is 1.

The foregoing formula may be expressed as follows:

The receiving time of the responder announce frame=ResponderTransmitOffset−[AckCountIndex*TXTIME(TDD Ack)+(SswCountIndex+1)*TXTIME(TDD SSWgroup)+(SswCountIndex+AckCountIndex)*SBIFS].

In the foregoing three manners, CountIndex≥0 and is an integer, and AckCountIndex≥0 and is an integer. It should be understood that, in this embodiment of this application, CountIndex may be numbered from 0 (that is, CountIndex≥0 and is an integer), or CountIndex may be numbered from 1 (that is, CountIndex≥1 and is an integer). In addition, AckCountIndex may be numbered from 0 (that is, AckCountIndex≥0 and is an integer), or AckCountIndex may be numbered from 1 (that is, AckCountIndex≥1 and is an integer). Similarly, if CountIndex and AckCountIndex have different value ranges, the formula for determining, by the apparatus A, the receiving time of the responder announce frame further includes other variations. Apparently, the other corresponding variations fall within the protection scope of this embodiment of this application, and a specific variation is not described herein.

In a second possible implementation, S101 of determining, by an information receiving apparatus, an information receiving time includes: determining the information receiving time based on any two of a time division duplex sector sweep acknowledgement frame count index, a count index, and a time division duplex sector sweep frame count index, duration of a time division duplex sector sweep feedback frame, duration of a time division duplex sector sweep frame, and duration of a time division duplex sector sweep acknowledgement frame.

Further, as shown in FIG. 2, S101 includes: determining, by an apparatus A, a receiving time of a TDD SSW feedback frame based on any two of a time division duplex sector sweep acknowledgement frame count index, a count index, and a time division duplex sector sweep frame count index, duration of a time division duplex sector sweep feedback frame, duration of a time division duplex sector sweep frame, and duration of a time division duplex sector sweep acknowledgement frame. A method for determining, by the apparatus A, the receiving time of the TDD SSW feedback frame specifically includes but is not limited to the following three manners:

(1) The receiving time of the TDD SSW feedback frame=a responder feedback offset−[the duration of the time division duplex sector sweep feedback frame+the time division duplex sector sweep acknowledgement frame count index*the duration of the time division duplex sector sweep acknowledgement frame+(the count index−the time division duplex sector sweep acknowledgement frame count index)*the duration of the time division duplex sector sweep frame+the count index*a short beamforming interframe spacing]. (Formula 2-1-1)

Figure 5:
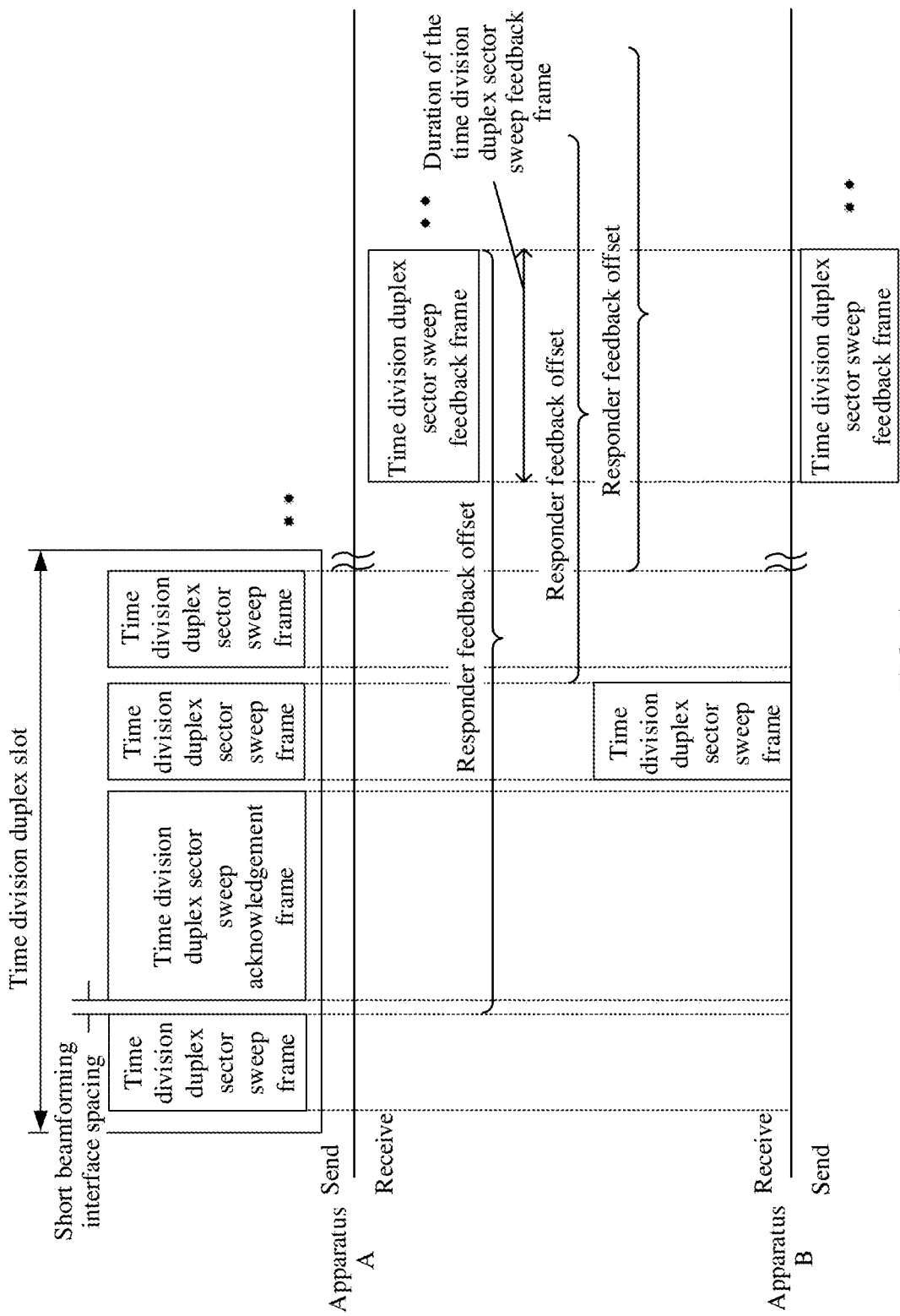
FIG. 5 is a schematic diagram of a setting of ResponderFeedbackOffset in a second possible implementation according to an embodiment of this application.

Meanings and value ranges of the parameters in the formula 2-1-1 are the same as the meanings and value ranges of the corresponding parameters in the formula 1-1-1, and differences include the following parameters:

a. The responder feedback offset. As shown in FIG. 5, a value of ResponderFeedbackOffset is duration, where the duration is set to a sum of duration from a time when the apparatus A finishes sending a first TDD SSW group frame/TDD SSW ACK frame to a start time when an apparatus B feeds back a TDD SSW feedback frame, and duration of the TDD SSW feedback frame. The duration of the TDD SSW feedback frame is duration of a PHY layer PPDU corresponding to the TDD SSW feedback frame. In addition, values of Responder Feedback Offset fields in all TDD SSW frames are the same, that is, a value of a Responder Feedback Offset field in each subsequent TDD SSW frame is set to the sum of the "duration from the time when the apparatus A finishes sending the first TDD SSW group frame/TDD SSW ACK frame to the start time when the apparatus B feeds back the TDD SSW feedback frame, and the duration of the TDD SSW feedback frame".

b. The duration of the time division duplex sector sweep feedback frame. The duration of the time division duplex sector sweep feedback frame is duration of a PHY layer PPDU corresponding to the TDD SSW feedback frame.

The foregoing formula may be expressed as follows:

The receiving time of the TDD SSW feedback frame=ResponderFeedbackOffset−[TXTIME(TDD Feedback)+AckCountIndex*TXTIME(TDD Ack)+(CountIndex−AckCountIdex)*TXTIME(TDD SSWgroup)+CountIndex*SBIFS].

(2) The receiving time of the TDD SSW feedback frame=a responder feedback offset−[the duration of the time division duplex sector sweep feedback frame+(the count index−the time division duplex sector sweep frame count index)*the duration of the time division duplex sector sweep acknowledgement frame+the time division duplex sector sweep frame count index*the duration of the time division duplex sector sweep frame+the count index*a short beamforming interframe spacing]. (Formula 2-1-2)

Meanings and value ranges of the parameters in the formula 2-1-2 are the same as the meanings and value ranges of the corresponding parameters in the formula 1-1-2, and differences include the following parameters:

a. The responder feedback offset. As shown in FIG. 5, a value of ResponderFeedbackOffset is duration, where the duration is a sum of duration from a time when the apparatus A finishes sending a first TDD SSW group frame/TDD SSW ACK frame to a start time when an apparatus B feeds back a TDD SSW feedback frame, and duration of the TDD SSW feedback frame. The duration of the TDD SSW feedback frame is duration of a PHY layer PPDU corresponding to the TDD SSW feedback frame.

b. The duration of the time division duplex sector sweep feedback frame. The duration of the time division duplex sector sweep feedback frame is duration of a PHY layer PPDU corresponding to the TDD SSW feedback frame.

The foregoing formula may be expressed as follows:

The receiving time of the TDD SSW feedback frame=ResponderFeedbackOffset−[TXTIME(TDD Feedback)+(CountIndex−SswCountIndex)*TXTIME(TDD Ack)+SswCountIndex*TXTIME(TDD SSWgroup)+Count Index*SBIFS].

(3) The receiving time of the TDD SSW feedback frame=a responder feedback offset−[the duration of the time division duplex sector sweep feedback frame+the time division duplex sector sweep acknowledgement frame count index*the duration of the time division duplex sector sweep acknowledgement frame+the time division duplex sector sweep frame count index*the duration of the time division duplex sector sweep frame+(the time division duplex sector sweep acknowledgement frame count index+the time division duplex sector sweep frame count index)*a short beamforming interframe spacing]. (Formula 2-1-3)

Meanings and value ranges of the parameters in the formula 2-1-3 are the same as the meanings and value ranges of the corresponding parameters in the formula 1-1-3, and differences include the following parameters:

a. The responder feedback offset. As shown in FIG. 5, a value of ResponderFeedbackOffset is duration, where the duration is a sum of duration from a time when the apparatus A finishes sending a first TDD SSW group frame/TDD SSW ACK frame to a start time when an apparatus B feeds back a TDD SSW feedback frame, and duration of the TDD SSW feedback frame. The duration of the TDD SSW feedback frame is duration of a PHY layer PPDU corresponding to the TDD SSW feedback frame.

b. The duration of the time division duplex sector sweep feedback frame. The duration of the time division duplex sector sweep feedback frame is duration of a PHY layer PPDU corresponding to the TDD SSW feedback frame.

The foregoing formula may be expressed as follows:

The receiving time of the TDD SSW feedback frame=ResponderFeedbackOffset−[TXTIME (TDD Feedback)+AckCountIndex*TXTIME (TDD Ack)+SswCountIndex*TXTIME(TDD SSWgroup)+(SswCountIndex+AckCountIndex) *SBIFS].

In the foregoing three manners, CountIndex≥0 and is an integer, and AckCountIndex≥0 and is an integer. It should be understood that, in this embodiment of this application, CountIndex may be numbered from 0 (that is, CountIndex≥0 and is an integer), or CountIndex may be numbered from 1 (that is, CountIndex≥1 and is an integer). In addition, AckCountIndex may be numbered from 0 (that is, AckCountIndex≥0 and is an integer), or AckCountIndex may be numbered from 1 (that is, AckCountIndex≥1 and is an integer). If CountIndex and AckCountIndex have different value ranges, the formulas 2-1-1, 2-1-2, and 2-1-3 have corresponding variations. Apparently, the corresponding variations fall within the protection scope of this embodiment of this application, and a specific variation is not described herein.

If a difference between the setting of InitiatorAckOffset/InitiatorTransmitOffset/ResponderTransmitOffset in the second possible implementation and the setting of InitiatorAckOffset/InitiatorTransmitOffset/ResponderTransmitOffset in the first possible implementation is the same as a difference (that is, a difference between FIG. 5 and FIG. 4) between the setting of ResponderFeedbackOffset in the second possible implementation and the setting of ResponderFeedbackOffset in the first possible implementation, for variations of the formula for determining, by the apparatus B, the receiving time of the TDD SSW ACK frame, the formula for determining, by the apparatus B, the receiving time of the initiator announce frame, and the formula for determining, by the apparatus A, the receiving time of the responder announce frame, refer to the formula 2-1-1, the formula 2-1-2, and the formula 2-1-3, and details are not described herein.

In a third possible implementation, S101 of determining, by an information receiving apparatus, an information receiving time includes: determining the information receiving time based on any two of a time division duplex sector sweep acknowledgement frame count index, a count index, and a time division duplex sector sweep frame count index, duration of a time division duplex sector sweep frame, and duration of a time division duplex sector sweep acknowledgement frame.

Further, as shown in FIG. 2, S101 includes: determining, by an apparatus A, a receiving time of a TDD SSW feedback frame based on any two of a time division duplex sector sweep acknowledgement frame count index, a count index, and a time division duplex sector sweep frame count index, duration of a time division duplex sector sweep frame, and duration of a time division duplex sector sweep acknowledgement frame. A method for determining, by the apparatus A, the receiving time of the TDD SSW feedback frame specifically includes but is not limited to the following three manners:

(1) The receiving time of the TDD SSW feedback frame=a responder feedback offset−[the time division duplex sector sweep acknowledgement frame count index*the duration of the time division duplex sector sweep acknowledgement frame+(the count index−the time division duplex sector sweep acknowledgement frame count index)*the duration of the time division duplex sector sweep frame+the count index*a short beamforming interframe spacing]. (Formula 3-1-1)

Figure 6:
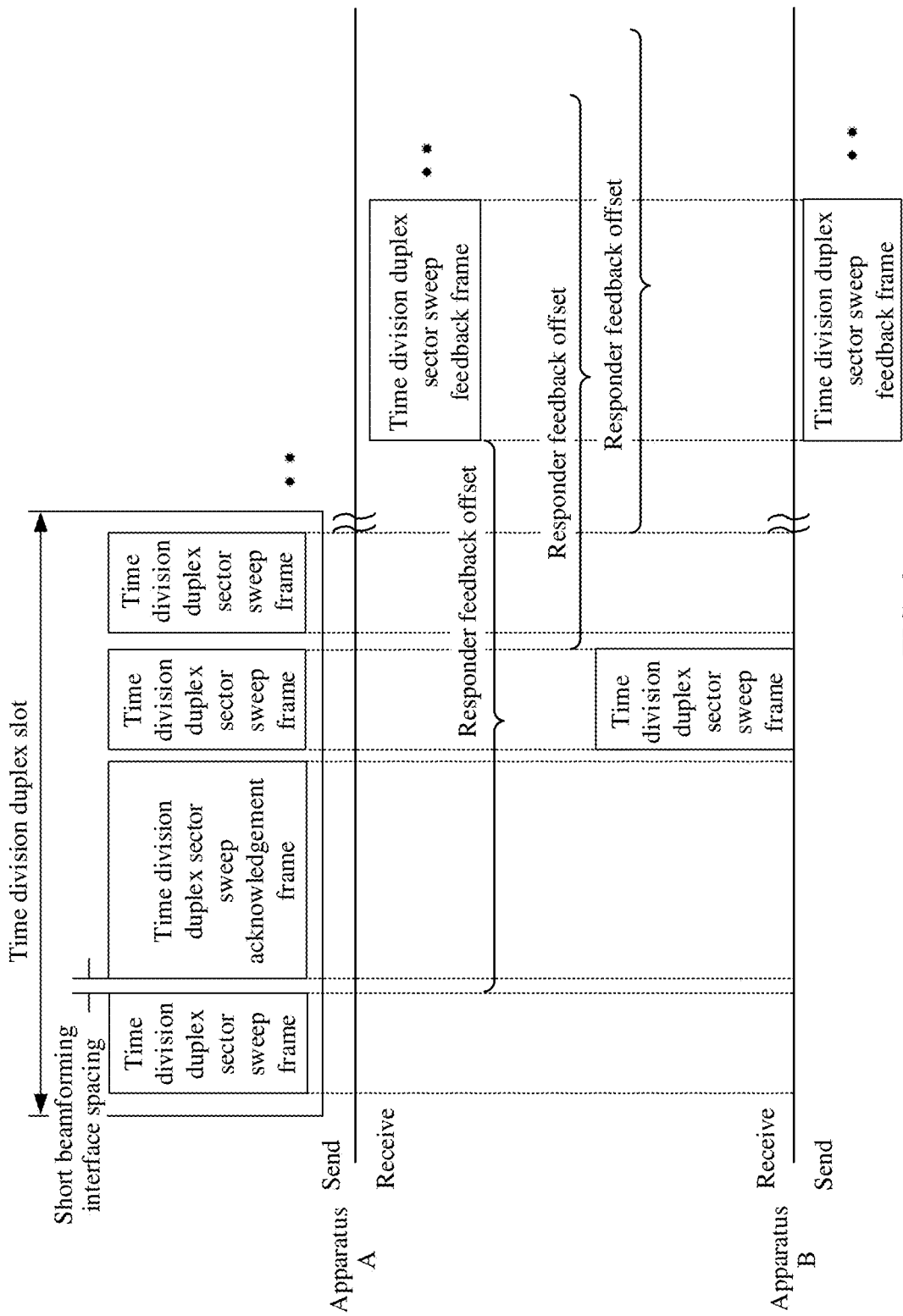
FIG. 6 is a schematic diagram of a setting of ResponderFeedbackOffset in a third possible implementation according to an embodiment of this application.

Meanings and value ranges of the parameters in the formula 3-1-1 are the same as the meanings and value ranges of the corresponding parameters in the formula 1-1-1, and differences include the following parameters:

a. The responder feedback offset. As shown in FIG. 6, a value of ResponderFeedbackOffset is duration, and the duration is set from a time when the apparatus A finishes sending a first TDD SSW group frame/TDD SSW ACK frame to a start time when the apparatus B feeds back a TDD SSW feedback frame. In addition, values of Responder Feedback Offset fields in all TDD SSW frames are the same, that is, a value of a Responder Feedback Offset field in each subsequent TDD SSW frame is set to the "duration from the time when the apparatus A finishes sending the first TDD SSW group frame/TDD SSW ACK frame to the start time when the apparatus B feeds back the TDD SSW feedback frame".

b. The duration of the time division duplex sector sweep feedback frame. The duration of the time division duplex sector sweep feedback frame is duration of a PHY layer PPDU corresponding to the TDD SSW feedback frame.

The foregoing formula may be expressed as follows:

The receiving time of the TDD SSW feedback frame=ResponderFeedbackOffset− [AckCountIndex*TXTIME(TDD Ack)+ (CountIndex−AckCountIdex)*TXTIME(TDD SSWgroup)+CountIndex*SBIFS].

(2) The receiving time of the TDD SSW feedback frame=a responder feedback offset−[(the count index−the time division duplex sector sweep frame count index)*the duration of the time division duplex sector sweep acknowledgement frame+the time division duplex sector sweep frame count index*the duration of the time division duplex sector sweep frame+the count index*a short beamforming interframe spacing]. (Formula 3-1-2))

Meanings and value ranges of the parameters in the formula 3-1-2 are the same as the meanings and value ranges of the corresponding parameters in the formula 1-1-2, and differences include the following parameters:

a. The responder feedback offset. As shown in FIG. 6, a value of ResponderFeedbackOffset is duration, where the duration is duration from a time when the apparatus A finishes sending a TDD SSW group frame/TDD SSW ACK frame to a start time when an apparatus B feeds back a TDD SSW feedback frame.

b. The duration of the time division duplex sector sweep feedback frame. The duration of the time division duplex sector sweep feedback frame is duration of a PHY layer PPDU corresponding to the TDD SSW feedback frame.

The foregoing formula may be expressed as follows:

The receiving time of the TDD SSW feedback frame=ResponderFeedbackOffset−[(CountIndex−SswCountIndex)*TXTIME(TDD Ack)+SswCountIndex*TXTIME(TDD SSWgroup)+Count Index*SBIFS].

(3) The receiving time of the TDD SSW feedback frame=a responder feedback offset−[the time division duplex sector sweep acknowledgement frame count index*the duration of the time division duplex sector sweep acknowledgement frame+the time division duplex sector sweep frame count index*the duration of the time division duplex sector sweep frame+(the time division duplex sector sweep acknowledgement frame count index+the time division duplex sector sweep frame count index)*a short beamforming interframe spacing]. (Formula 3-1-3)

Meanings and value ranges of the parameters in the formula 3-1-3 are the same as the meanings and value ranges of the corresponding parameters in the formula 1-1-3, and differences include the following parameters:

a. The responder feedback offset. As shown in FIG. 6, a value of ResponderFeedbackOffset is duration, where the duration is duration from a time when the apparatus A finishes sending a first TDD SSW group frame/TDD SSW ACK frame to a start time when an apparatus B feeds back a TDD SSW feedback frame.

b. The duration of the time division duplex sector sweep feedback frame. The duration of the time division duplex sector sweep feedback frame is duration of a PHY layer PPDU corresponding to the TDD SSW feedback frame.

The foregoing formula may be expressed as follows:

The receiving time of the TDD SSW feedback frame=ResponderFeedbackOffset−[AckCountIndex*TXTIME(TDD Ack)+(SswCountIndex)*TXTIME(TDD SSWgroup)+(SswCountIndex+AckCountIndex)*SBIFS].

In the foregoing three manners, CountIndex≥0 and is an integer, and AckCountIndex≥0 and is an integer. It should be understood that, in this embodiment of this application, CountIndex may be numbered from 0 (that is, CountIndex≥0 and is an integer), or CountIndex may be numbered from 1 (that is, CountIndex≥1 and is an integer). In addition, AckCountIndex may be numbered from 0 (that is, AckCountIndex≥0 and is an integer), or AckCountIndex may be numbered from 1 (that is, AckCountIndex≥1 and is an integer). If CountIndex and AckCountIndex have different value ranges, the formulas 3-1-1, 3-1-2, and 3-1-3 have corresponding variations. Apparently, the corresponding variations fall within the protection scope of this embodiment of this application, and a specific variation is not described herein.

If a difference between the setting of InitiatorAckOffset/InitiatorTransmitOffset/ResponderTransmitOffset in the third possible implementation and the setting of InitiatorAckOffset/InitiatorTransmitOffset/ResponderTransmitOffset in the second possible implementation is the same as a difference (that is, a difference between FIG. 6 and FIG. 5) between the setting of ResponderFeedbackOffset in the third possible implementation and the setting of ResponderFeedbackOffset in the second possible implementation, for variations of the formula for determining, by the apparatus B, the receiving time of the TDD SSW ACK frame, the formula for determining, by the apparatus B, the receiving time of the initiator announce frame, and the formula for determining, by the apparatus A, the receiving time of the responder announce frame, refer to the formula 3-1-1, the formula 3-1-2, and the formula 3-1-3, and details are not described herein.

S102. The information receiving apparatus receives information at the determined information receiving time.

In S102, the information receiving apparatus receives the information at the determined information receiving time. For example, the apparatus A receives a TDD SSW feedback frame at a receiving time of the TDD SSW feedback frame that is determined in S101. For example, the apparatus B receives a TDD SSW ACK frame at the receiving time of the TDD SSW ACK frame that is determined in S101. For other frames, it is the same case.

Corresponding to the foregoing information receiving method, an embodiment of this application further provides an information sending method. As shown in FIG. 3, an information sending method includes the following steps.

S201. An information sending apparatus determines an information sending time.

S201 and S101 correspond to each other. For example, a method for determining, by an apparatus B, a sending time of a TDD SSW feedback frame is a method for determining, by an apparatus A, a receiving time of the TDD SSW feedback frame, a method for determining, by an apparatus A, a sending time of a TDD SSW ACK frame is a method for determining, by an apparatus B, a receiving time of the TDD SSW ACK frame, a method for determining, by an apparatus A, a sending time of an initiator announce frame is a method for determining, by an apparatus B, a receiving time of the initiator announce frame, and a method for determining, by an apparatus A, a receiving time of a responder announce frame is a method for determining, by an apparatus B, a sending time of the responder announce frame.

All content of S101 can be cited herein to describe S201. Specific content is not described herein again.

S202. The information sending apparatus sends information at the determined information sending time.

In S202, the apparatus B sends a TDD SSW feedback frame at a sending time of the TDD SSW feedback frame that is determined in S201. For example, the apparatus A sends a TDD SSW ACK frame at the sending time of the TDD SSW ACK frame that is determined in S201. For other frames, it is the same case.

According to the information receiving/sending method provided in the embodiments of this application, the information sending apparatus can send information at an accurate information sending time, the information receiving apparatus can receive the information at an accurate information receiving time, and system communication can be normally performed.

An embodiment of this application further provides an information receiving apparatus and an information sending apparatus.

Figure 7:
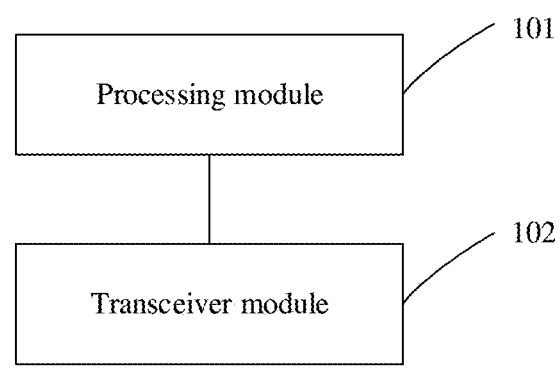
FIG. 7 shows an information receiving/sending apparatus according to an embodiment of this application.

FIG. 7 shows an information receiving/sending apparatus according to an embodiment of this application. It should be understood that the information receiving apparatus in this embodiment of this application has any function of the information receiving apparatus in the foregoing methods, and the information sending apparatus in this embodiment of this application has any function of the information sending apparatus in the foregoing methods.

As shown in FIG. 7, an information receiving apparatus includes a processing module 101 and a transceiver module 102.

The processing module 101 is configured to determine a receiving time of information.

The information includes: a TDD SSW feedback frame, a TDD SSW ACK frame, an initiator announce frame, and a responder announce frame.

When the information is the TDD SSW feedback frame, the information receiving apparatus is the apparatus A in FIG. 2.

When the information is the TDD SSW ACK frame, the information receiving apparatus is the apparatus B in FIG. 2.

When the information is the initiator announce frame, the information receiving apparatus is the apparatus B in FIG. 2.

When the information is the responder announce frame, the information receiving apparatus is the apparatus A in FIG. 2.

The transceiver module 102 is configured to receive information at the determined information receiving time.

As shown in FIG. 2, at the receiving time of the TDD SSW feedback frame that is determined by the processing module 101 of the receiving apparatus A, the receiving module 102 of the apparatus A receives the TDD SSW feedback frame.

As shown in FIG. 2, at the receiving time of the TDD SSW ACK frame that is determined by the processing module 101 of the receiving apparatus B, the receiving module 102 of the apparatus B receives the TDD SSW ACK frame.

As shown in FIG. 2, at the receiving time of the initiator announce frame that is determined by the processing module 101 of the receiving apparatus B, the receiving module 102 of the apparatus B receives the initiator announce frame.

As shown in FIG. 2, at the receiving time of the responder announce frame that is determined by the processing module 101 of the receiving apparatus A, the receiving module 102 of the apparatus A receives the responder announce frame.

As shown in FIG. 7, an information sending apparatus includes a processing module 101 and a transceiver module 102.

The processing module 101 is configured to determine a sending time of information.

The information includes: a TDD SSW feedback frame, a TDD SSW ACK frame, an initiator announce frame, and a responder announce frame.

When the information is the TDD SSW feedback frame, the information sending apparatus is the apparatus B in FIG. 2.

When the information is the TDD SSW ACK frame, the information sending apparatus is the apparatus A in FIG. 2.

When the information is the initiator announce frame, the information sending apparatus is the apparatus A in FIG. 2.

When the information is the responder announce frame, the information sending apparatus is the apparatus B in FIG. 2.

The transceiver module 102 is configured to send information at the determined sending time of the information.

As shown in FIG. 2, at the sending time of the TDD SSW feedback frame that is determined by the processing module 101 of the sending apparatus B, the sending module 102 of the apparatus B sends the TDD SSW feedback frame.

As shown in FIG. 2, at the sending time of the TDD SSW ACK frame that is determined by the processing module 101 of the sending apparatus A, the sending module 102 of the apparatus A sends the TDD SSW ACK frame.

As shown in FIG. 2, at the sending time of the initiator Announce frame that is determined by the processing module 101 of the sending apparatus A, the sending module 102 of the apparatus A sends the initiator Announce frame.

As shown in FIG. 2, at the sending time of the responder announce frame that is determined by the processing module 101 of the sending apparatus B, the sending module 102 of the apparatus B sends the responder announce frame.

According to the information receiving apparatus/sending apparatus provided in the embodiments of this application, the information sending apparatus can send information at an accurate information sending time, the information receiving apparatus can receive the information at an accurate information receiving time, and system communication can be normally performed.

The information receiving apparatus/sending apparatus provided in the embodiments of this application may be implemented in a plurality of types of product forms. For example, the information receiving apparatus/sending apparatus may be configured as a general-purpose processing system. For example, the information receiving apparatus/sending apparatus may be implemented by using a general bus architecture. For example, the information receiving apparatus/sending apparatus may be implemented by an ASIC (application-specific integrated circuit) and the like. The following provides several possible product forms of the information receiving apparatus/sending apparatus in the embodiments of this application. It should be understood that the following describes only an example, but does not limit the possible product forms of the embodiments of this application.

Figure 8:
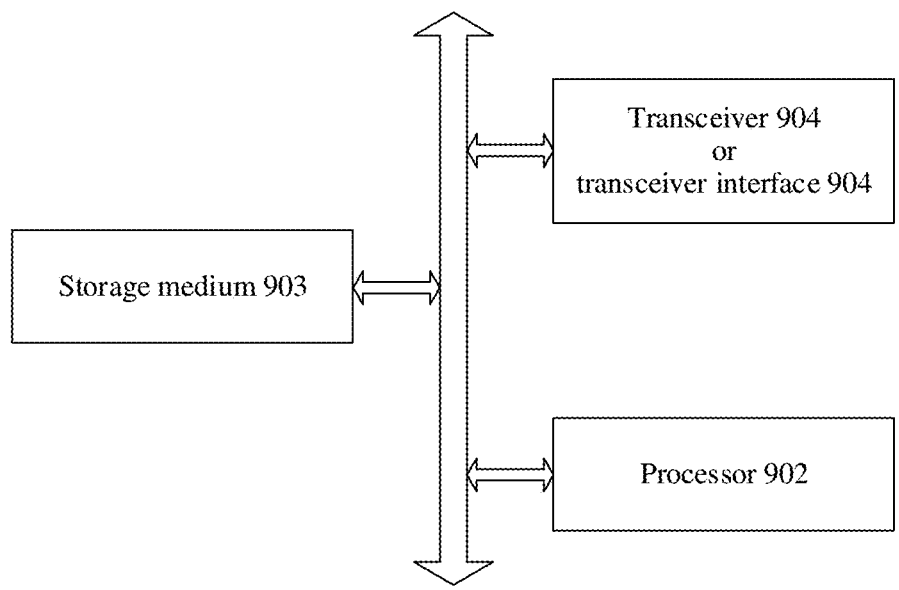
FIG. 8 is a structural diagram of a possible product form of an information receiving apparatus/sending apparatus according to an embodiment of this application.

FIG. 8 is a structural diagram of a possible product form of an information receiving apparatus/sending apparatus according to an embodiment of this application.

In a possible product form, the information receiving apparatus/sending apparatus may be an information receiving apparatus/sending device, and the information receiving apparatus/sending device includes a processor 902 and a transceiver 904/transceiver interface 904. Optionally, the information receiving apparatus/sending device may further include a storage medium 903.

In another possible product form, the information receiving apparatus/sending apparatus may be an information receiving apparatus/sending board, and the information receiving apparatus/sending board includes a processor 902 and a transceiver 904/transceiver interface 904. Optionally, the information receiving apparatus/sending board may further include a storage medium 903.

In another possible product form, the information receiving apparatus/sending apparatus is also implemented by a general-purpose processor, to be specific, implemented by a commonly called chip. The general-purpose processor includes a processors 902 and a transceiver interface 904. Optionally, the general-purpose processor may further include a storage medium 903.

In another possible product form, the information receiving apparatus/sending apparatus may also be implemented by using the following components: one or more FPGAs (field programmable gate arrays), a PLD (programmable logic device), a controller, a state machine, a gate logic, a discrete hardware component, any other suitable circuit, or any combination of circuits that can perform various functions described throughout this application.

A person of ordinary skill in the art may understand that all or some of the steps of the method embodiments may be implemented by a program instructing related hardware. The program may be stored in a computer-readable storage medium. When the program is being executed, the steps of the method embodiments are performed. The foregoing storage medium includes various media that can store program code, such as a ROM, a RAM, a magnetic disk, or an optical disc.

Figure 9:
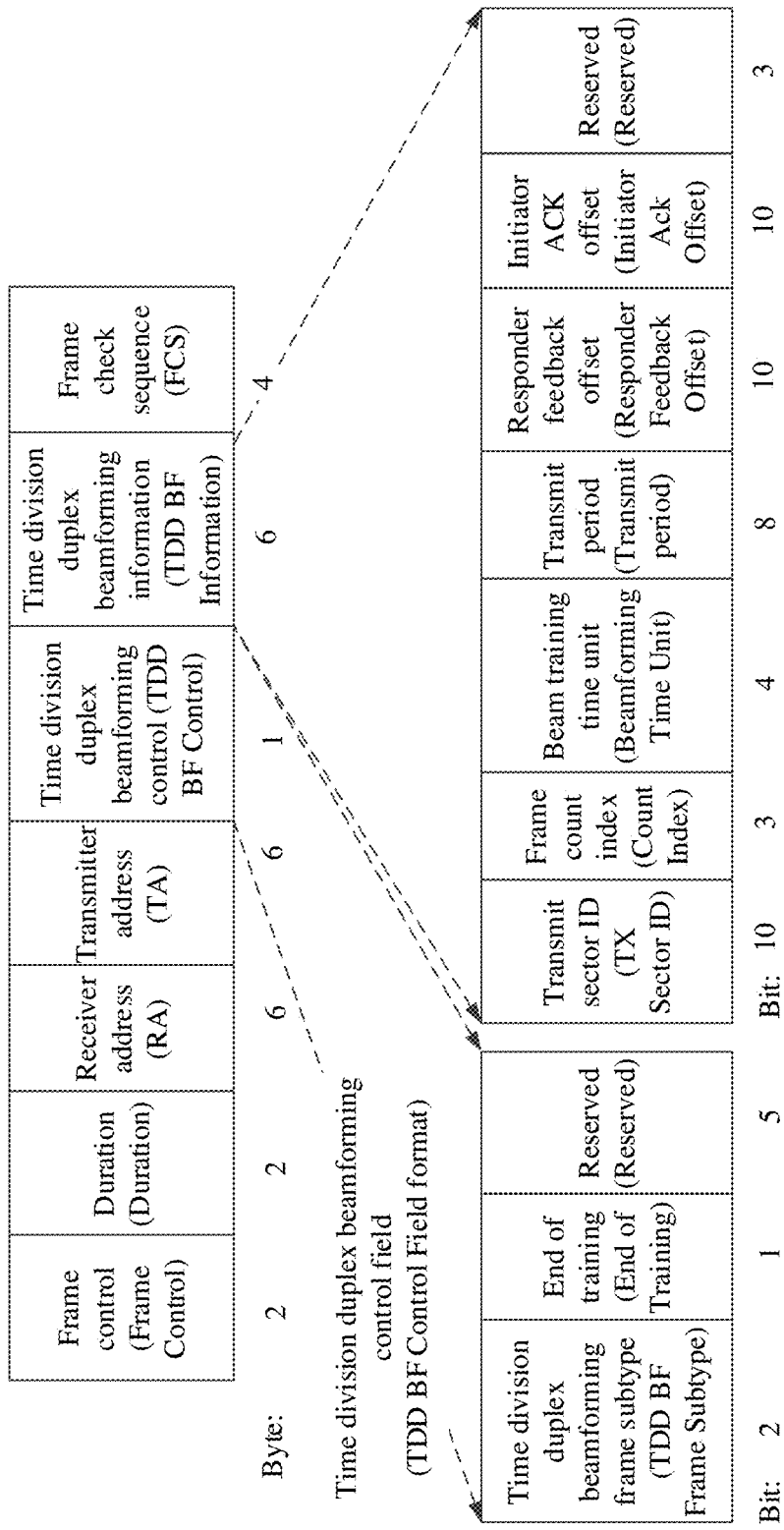
FIG. 9 shows a TDD sector sweep (SSW) frame format (TDD individual BF).

FIG. 9 shows a TDD SSW frame format (TDD individual BF), and may also be referred to as a TDD SSW frame format for TDD SU BF.

As shown in FIG. 9, by setting a value of an End of Training subfield to 1, an initiator may instruct to end TDD beamforming training after a corresponding responder finishes transmitting remaining TDD SSW frames. In the prior art (the TDD individual BF), the initiator performs TDD beamforming training with a single user, so that only one bit in a TDD BF control field in the TDD SSW frame needs to be used to indicate an end of training, as shown in FIG. 4. However, for a case of TDD group BF as provided, TDD SSW frames transmitted by the initiator in a same TDD SSW slot are received by a plurality of users (responders), and therefore, it is necessary to separately instruct each responder whether to end training. To resolve this issue, two solutions are provided:

Solution 1: For each responder, an indication field is introduced to instruct whether to end training with the responder. For specific modifications to a TDD SSW frame structure, refer to FIG. 1. For each responder, an indication field is introduced in a responder info subfield of the responder. For example, the indication field may be a one-bit field or a multi-bit field.

Solution 2: Different from solution 1, for each responder, one bit is not introduced to indicate an end of training, but an indication function is achieved by setting a responder ID. Specifically, two responder IDs are allocated to each responder, and the two responder IDs are referred to as RID 1 and RID 2 for ease of description. If the initiator does not intend to end training, a value of a Responder ID subfield in a TDD SSW frame uses RID 1. If the initiator intends to end training, a value of a Responder ID subfield in a TDD SSW frame uses RID 2. According to this method, the responder can learn whether to end training by identifying only content of the Responder ID subfield.

In addition, when a receive end does not receive a TDD SSW frame, the receive end needs to perform reception sweeping on all receiving sectors of the receive end, and dwells on each receiving sector for a time period to increase a probability of receiving the TDD SSW frame. A value of the dwell time is set by using SectorDwellTime. In the prior art (the TDD individual BF), a value of SectorDwellTime is set to [2×TXTIME(TDD SSWIndividual)+SBIFS], where TDD SSWIndividual is a time for TDD SSW during the TDD individual BF. In the TDD group BF proposed, due to an increase in a quantity of responders, the time for TDD SSW also increases. In this case, if a previous SectorDwell-Time setting manner is still used, the probability of receiving the TDD SSW frame by the receive end may be reduced. To resolve this problem, two solutions are provided:

Solution 1: The value of SectorDwellTime is set to [3 or more×TXTIME(TDD SSWIndividual)+SBIFS], where TDD SSWIndividual is the time for TDD SSW in the TDD individual BF.

Solution 2: First, SectorDwellTime is still set to [2×TXTIME(TDD SSWIndividual)+SBIFS], and then if the TDD SSW frame is not received, SectorDwellTime gradually expands (linearly or non-linearly), and stops expansion after expanding to a specific extent or starts to reduce after expanding to a specific extent. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that method steps and units described with reference to the embodiments disclosed in this specification may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

A person skilled in the art may understand that, for ease of convenience and brevity, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, and indirect couplings or communication connections between the apparatuses or units may be electrical connections, mechanical connections, or connections in other forms.

The units described as separate parts may or may not be physically separate, and parts displayed as units may or may not be physical units, and may be located at one position, or may be distributed on a plurality of network units. Some or all of the units may be selected based on actual needs to achieve the objectives of the solutions in the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
at least one processor, configured to:
determine a receiving time of information based on a duration of a time division duplex sector sweep frame, a duration of a time division duplex sector sweep acknowledgement frame, and any two of a time division duplex sector sweep acknowledgement frame count index, a count index, a time division duplex sector sweep frame count index; and
a transceiver coupled to the at least one processor, configured to receive the information at the determined receiving time.

2. The apparatus according to claim 1, wherein the information is a time division duplex sector sweep feedback frame, and the at least one processor is configured to determine the receiving time of the time division duplex sector sweep feedback frame by:
determining the receiving time of the time division duplex sector sweep feedback frame as
the receiving time of the time division duplex sector sweep feedback frame=a responder feedback offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:
the responder feedback offset is a value of a Responder Feedback Offset subfield in one or more time division duplex sector sweep frames, the one or more time division duplex sector sweep frames have a same TX sector ID, and the one or more time division duplex sector sweep frames are sent in a TDD slot,
the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot,
the duration of the time division duplex sector sweep acknowledgement frame is duration of a PHY layer PPDU corresponding to the time division duplex sector sweep acknowledgement frame,
the count index is a total count value of frames sent in a TDD slot, and the frames include the time division duplex sector sweep frame and the time division duplex sector sweep acknowledgement frame,
the duration of the time division duplex sector sweep frame is duration of a PHY layer PPDU corresponding to the time division duplex sector sweep frame, and
the short beamforming interframe spacing is a spacing between adjacent frames in frames sent in a TDD slot, where the frames include the time division duplex sector sweep frame and the time division duplex sector sweep acknowledgement frame.

3. The apparatus according to claim 1, wherein the information is the time division duplex sector sweep acknowledgement frame, and the at least one processor is configured to determine the receiving time of the time division duplex sector sweep acknowledgement frame by:
determining the receiving time of the time division duplex sector sweep acknowledgement frame as
the receiving time of the time division duplex sector sweep acknowledgement frame=an initiator acknowledgement offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:
the initiator acknowledgement offset is a value of an Initiator Ack Offset subfield in one or more time division duplex sector sweep frames, the one or more time division duplex sector sweep frames have a same TX sector ID, and the one or more time division duplex sector sweep frames are sent in a TDD slot,
the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot,
the duration of the time division duplex sector sweep acknowledgement frame is duration of a PHY layer PPDU corresponding to the time division duplex sector sweep acknowledgement frame,
the count index is a total count value of frames sent in a TDD slot, and the frames include the time division duplex sector sweep frame and the time division duplex sector sweep acknowledgement frame,
the duration of the time division duplex sector sweep frame is duration of a PHY layer PPDU corresponding to the time division duplex sector sweep frame, and
the short beamforming interframe spacing is a spacing between adjacent frames in frames sent in a TDD slot, where the frames include the time division duplex sector sweep frame and the time division duplex sector sweep acknowledgement frame.

4. The apparatus according to claim 1, wherein the information is an initiator announce frame, and the at least one processor is configured to determine the receiving time of the initiator announce frame by:
determining the receiving time of the initiator announce frame as
the receiving time of the initiator announce frame=an initiator transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:

the initiator transmit offset is a value of an Initiator Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

5. The apparatus according to claim 1, wherein the information is a responder announce frame, and the at least one processor is configured to determine the receiving time of the responder announce frame by:

determining the receiving time of the responder announce frame as the receiving time of the responder announce frame=a responder transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:

the responder transmit offset is a value of a Responder Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

6. An apparatus, comprising:
at least one processor, configured to:
determine a sending time of information based on a duration of a time division duplex sector sweep frame, a duration of a time division duplex sector sweep acknowledgement frame, and any two of a time division duplex sector sweep acknowledgement frame count index, a count index, a time division duplex sector sweep frame count index; and
a transceiver coupled to the at least one processor, configured to send the information at the determined sending time.

7. The apparatus according to claim 6, wherein the information is a time division duplex sector sweep feedback frame, and the at least one processor is configured to determine the sending time of the time division duplex sector sweep feedback frame by:

determining the sending time of the time division duplex sector sweep feedback frame as the sending time of the time division duplex sector sweep feedback frame=a responder feedback offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:

the responder feedback offset is a value of a Responder Feedback Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

8. The apparatus according to claim 6, wherein the information is the time division duplex sector sweep acknowledgement frame, and the at least one processor is configured to determine the sending time of the time division duplex sector sweep acknowledgement frame by:
- determining the sending time of the time division duplex sector sweep acknowledgement frame as
- the sending time of the time division duplex sector sweep acknowledgement frame=an initiator acknowledgement offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein
- the initiator acknowledgement offset is a value of an Initiator Ack Offset subfield in one or more time division duplex sector sweep frames, the one or more time division duplex sector sweep frames have a same TX sector ID, and the one or more time division duplex sector sweep frames are sent in a TDD slot,
- the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot,
- the duration of the time division duplex sector sweep acknowledgement frame is duration of a PHY layer PPDU corresponding to the time division duplex sector sweep acknowledgement frame,
- the count index is a total count value of frames sent in a TDD slot, and the frames include the time division duplex sector sweep frame and the time division duplex sector sweep acknowledgement frame,
- the duration of the time division duplex sector sweep frame is duration of a PHY layer PPDU corresponding to the time division duplex sector sweep frame, and
- the short beamforming interframe spacing is a spacing between adjacent frames in frames sent in a TDD slot, where the frames include the time division duplex sector sweep frame and the time division duplex sector sweep acknowledgement frame.

9. The apparatus according to claim 6, wherein the information is an initiator announce frame, and the at least one processor is configured to determine the sending time of the initiator announce frame by:
- determining the sending time of the initiator announce frame as
- the sending time of the initiator announce frame=an initiator transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:
- the initiator transmit offset is a value of an Initiator Transmit Offset subfield when a value of an End of Training subfield in the time division duplex sector sweep acknowledgement frame is 1,
- the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot,
- the duration of the time division duplex sector sweep acknowledgement frame is duration of a PHY layer PPDU corresponding to the time division duplex sector sweep acknowledgement frame,
- the count index is a total count value of frames sent in a TDD slot, and the frames include the time division duplex sector sweep frame and the time division duplex sector sweep acknowledgement frame,
- the duration of the time division duplex sector sweep frame is duration of a PHY layer PPDU corresponding to the time division duplex sector sweep frame, and
- the short beamforming interframe spacing is a spacing between adjacent frames in frames sent in a TDD slot, where the frames include the time division duplex sector sweep frame and the time division duplex sector sweep acknowledgement frame.

10. The apparatus according to claim 6, wherein the information is a responder announce frame, and the at least one processor is configured to determine the sending time of the responder announce frame by:
- determining the sending time of the responder announce frame as
- the sending time of the responder announce frame=a responder transmit offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:
- the responder transmit offset is a value of a Responder Transmit Offset subfield when a value of an End of Training subfield in the time division duplex sector sweep acknowledgement frame is 1,
- the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot,
- the duration of the time division duplex sector sweep acknowledgement frame is duration of a PHY layer PPDU corresponding to the time division duplex sector sweep acknowledgement frame,
- the count index is a total count value of frames sent in a TDD slot, and the frames include the time division duplex sector sweep frame and the time division duplex sector sweep acknowledgement frame,
- the duration of the time division duplex sector sweep frame is duration of a PHY layer PPDU corresponding to the time division duplex sector sweep frame, and
- the short beamforming interframe spacing is a spacing between adjacent frames in frames sent in a TDD slot, where the frames include the time division duplex sector sweep frame and the time division duplex sector sweep acknowledgement frame.

11. A non-transitory computer-readable medium having instructions stored thereon that, when executed by a computer, cause the computer to perform operations, the operations comprising:

determining a receiving time of information based on a duration of a time division duplex sector sweep frame, a duration of a time division duplex sector sweep acknowledgement frame, and any two of a time division duplex sector sweep acknowledgement frame count index, a count index, a time division duplex sector sweep frame count index; and receiving information at the determined receiving time.

12. The non-transitory computer-readable medium according to claim 11, wherein the information is a time division duplex sector sweep feedback frame, and the determining the receiving time of the time division duplex sector sweep feedback frame comprises:

determining the receiving time of the time division duplex sector sweep feedback frame as the receiving time of the time division duplex sector sweep feedback frame=a responder feedback offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:

the responder feedback offset is a value of a Responder Feedback Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

13. The non-transitory computer-readable medium according to claim 11, wherein the information is the time division duplex sector sweep acknowledgement frame, and the determining the receiving time of the time division duplex sector sweep acknowledgement frame comprises:

determining the receiving time of the time division duplex sector sweep acknowledgement frame as the receiving time of the time division duplex sector sweep acknowledgement frame=an initiator acknowledgement offset−[the time division duplex sector sweep acknowledgement frame count index*the duration of the time division duplex sector sweep acknowledgement frame+(the count index+1−the time division duplex sector sweep acknowledgement frame count index)*the duration of the time division duplex sector sweep frame+the count index*a short beamforming interframe spacing], wherein:

the initiator acknowledgement offset is a value of an Initiator Ack Offset subfield in one or more time division duplex sector sweep frames, the one or more time division duplex sector sweep frames have a same TX sector ID, and the one or more time division duplex sector sweep frames are sent in a TDD slot, the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

14. The non-transitory computer-readable medium according to claim 11, wherein the information is an initiator announce frame, and the determining the receiving time of the initiator announce frame comprises:

determining the receiving time of the initiator announce frame as the receiving time of the initiator announce frame=an initiator transmit offset−[the time division duplex sector sweep acknowledgement frame count index*the duration of the time division duplex sector sweep acknowledgement frame+(the count index+1—the time division duplex sector sweep acknowledgement frame count index)*the duration of the time division duplex sector sweep frame+the count index*a short beamforming interframe spacing], wherein:

the initiator transmit offset is a value of an Initiator Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

15. The non-transitory computer-readable medium according to claim 11, wherein the information is a responder announce frame, and the determining the receiving time of the responder announce frame comprises:

determining the receiving time of the responder announce frame as the receiving time of the responder announce frame=a responder transmit offset—[the time division duplex sector sweep acknowledgement frame count index*the duration of the time division duplex sector sweep acknowledgement frame+(the count index+1—the time division duplex sector sweep acknowledgement frame count index)*the duration of the time division duplex sector sweep frame+the count index*a short beamforming interframe spacing], wherein:

the responder transmit offset is a value of a Responder Transmit Offset subfield when a value of an End of Training subfield in the time division duplex sector sweep acknowledgement frame is 1, the time division duplex sector sweep acknowledgement frame count index is a quantity of time division duplex sector sweep acknowledgement frames that have been sent by a transmit end before a current time division duplex sector sweep frame is received, and one or more time division duplex sector sweep acknowledgement frames are sent in a TDD slot, the duration of the time division duplex sector sweep acknowledgement frame is duration of a PHY layer PPDU corresponding to the time division duplex sector sweep acknowledgement frame, the count index is a total count value of frames sent in a TDD slot, and the frames include the time division duplex sector sweep frame and the time division duplex sector sweep acknowledgement frame, the duration of the time division duplex sector sweep frame is duration of a PHY layer PPDU corresponding to the time division duplex sector sweep frame, and the short beamforming interframe spacing is a spacing between adjacent frames in frames sent in a TDD slot, where the frames include the time division duplex sector sweep frame and the time division duplex sector sweep acknowledgement frame.

* * * * *

UNITED STATES PATENT AND TRADEMARK OFFICE
CERTIFICATE OF CORRECTION

PATENT NO. : 11,456,847 B2
APPLICATION NO. : 16/987720
DATED : September 27, 2022
INVENTOR(S) : Xiao Han et al.

It is certified that error appears in the above-identified patent and that said Letters Patent is hereby corrected as shown below:

In the Claims

Claim 11, Column 39, Lines 7-8; insert -- the -- between "and" and "receiving".

Claim 13, Column 39, Line 64; delete "—" and insert -- - --.

Claim 13, Column 39, Line 67; delete "—" and insert -- - --.

Claim 14, Column 40, Line 41; delete "—" and insert -- - --.

Claim 14, Column 40, Line 44; delete "—" and insert -- - --.

Claim 15, Column 41, Line 14; delete "—" and insert -- - --.

Claim 15, Column 41, Line 17; delete "—" and insert -- - --.

Signed and Sealed this
Twenty-second Day of November, 2022

Katherine Kelly Vidal
*Director of the United States Patent and Trademark Office*